United States Patent [19]
Gotoh et al.

[11] Patent Number: 5,729,259
[45] Date of Patent: Mar. 17, 1998

[54] RANDOM JET RECORDING APPARATUS AND METHOD BY THICK AND THIN INKS

[75] Inventors: Fumihiro Gotoh, Kawasaki; Hiromitsu Hirabayashi, Yokohama; Noribumi Koitabashi, Yokohama; Yuji Akiyama, Yokohama; Hitoshi Sugimoto, Yokohama; Miyuki Matsubara, Tokyo; Hidehiko Kanda, Yokohama, all of Japan

[73] Assignee: Canon Kabushiki Kaisha, Tokyo, Japan

[21] Appl. No.: 252,162

[22] Filed: May 31, 1994

[30] Foreign Application Priority Data

May 31, 1993 [JP] Japan .................. 5-129564

[51] Int. Cl.⁶ .................. B41J 2/21; G01D 11/00
[52] U.S. Cl. .................. 347/43; 347/100
[58] Field of Search .................. 347/40, 100, 15, 347/131, 43, 14

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,608,577 | 8/1986 | Hori | 346/140 R |
| 4,680,596 | 7/1987 | Logan | 347/15 |
| 4,723,129 | 2/1988 | Endo et al. | 346/1.1 |
| 4,740,796 | 4/1988 | Endo et al. | 346/1.1 |
| 4,985,779 | 1/1991 | Gall | 358/298 |
| 5,142,374 | 8/1992 | Tajika et al. | 358/298 |
| 5,406,392 | 4/1995 | Aoki et al. | 358/502 |
| 5,430,469 | 7/1995 | Shioya et al. | 347/43 |

FOREIGN PATENT DOCUMENTS

| | | |
|---|---|---|
| 4-255361 | 9/1992 | Japan . |
| 5-31906 | 2/1993 | Japan . |
| 5-31918 | 2/1993 | Japan . |
| 5-64890 | 3/1993 | Japan . |

*Primary Examiner*—Benjamin R. Fuller
*Assistant Examiner*—Thinh Nguyen
*Attorney, Agent, or Firm*—Fitzpatrick, Cella, Harper & Scinto

[57] ABSTRACT

When an image to be recorded has a density to be recorded by using thin ink of thick and thin inks, areas of dots recording from ink discharge ports arranged normally to a main scan direction of a recording head are irregularly varied so that a variation of density in a low density area is reduced.

16 Claims, 23 Drawing Sheets

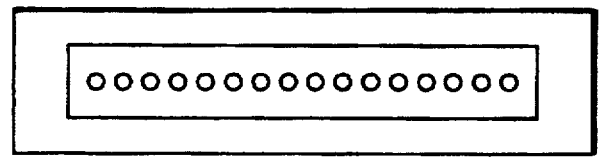
FIG. 22A
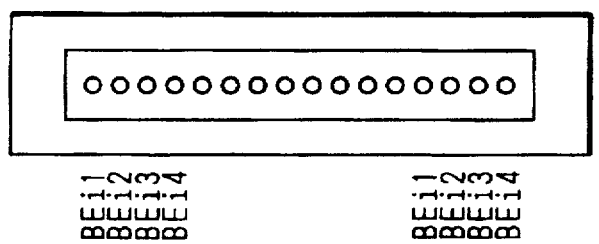
FIG. 22B
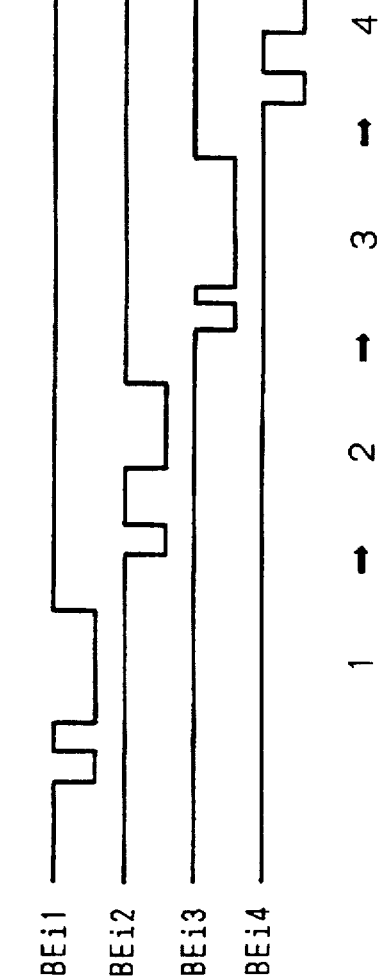
FIG. 22C-1
FIG. 22C-2
FIG. 22C-3
FIG. 22C-4

RANDOM JET RECORDING APPARATUS AND METHOD BY THICK AND THIN INKS

BACKGROUND OF THE INVENTION

1. Field of the Invention

The present invention relates to ink jet recording apparatus and method which use a plurality of thick and thin inks of the same color system.

2. Related Background Art

In a known ink jet recording method, ink is ejected from a plurality of discharge ports (or ejection orifices) formed in a recording head in accordance with record data to deposit ink droplets onto a recording medium such as a sheet to record the data. This recording method is used in a recording unit of a printer, a facsimile apparatus or a copying apparatus.

As a method for discharging ink, it has been known to provide heat generating elements (electro-thermal energy transducers) in the vicinity of discharge ports and apply electrical signals to the heat generating elements to locally heat ink and create air bubbles, and discharge ink from the discharge ports by pressure changes due to a change of state of the air bubbles. Further, it has been known to use electro-mechanical transducers such as piezo-electric elements to discharge the ink by a change in pressure of the ink due to a mechanical change.

When half-tone color is to be represented in those ink jet recording methods, the following methods are frequently adopted. Namely, a dot density control system in which the half-tone color is represented by controlling the number of ink dots per unit area for the ink dots of a predetermined size to be formed on a recording medium, or a dot diameter control system in which the half-tone color is represented by controlling a size of the ink dots is adopted in the ink jet recording.

The latter dot size control method requires a complex control to finely change the size of the dots and involves a number of restrictions in constructing the apparatus. Accordingly, the former dot density control method is generally widely used.

The method which uses the electro-thermal energy transducers as energy generation means for discharging the ink is advantageous in that it is easy to manufacture and permits a high density and high resolution recording. However, this method is essentially difficult to control a large change of pressure and cannot comply with the dot diameter control method which controls the dot diameter. Thus, the dot density control method is used in many cases.

As a representative one of binarization methods used in the representation of the half-tone by the dot density control method, a systematic dither method has been known. This method, however, involves a problem of the limitation of the number of tonalities by a size of matrix. Namely, in order to attain a large number of tonalities, it is necessary to increase the size of the matrix. As the size of the matrix increase, a size of each pixel of a record image formed by one matrix increases and a resolution is lowered.

Another representative one of the binarization methods is a conditional decision type dither method such as an error spread method. The systematic dither method described above is an independent decision type dither method which binarizes by using a threshold which is independent to an input pixel. In the conditional decision type dither method, the threshold is changed by taking peripheral pixels of an input pixel into account. The conditional decision type dither method which is represented by the error spread method has a high compatibility to the tonality and the resolution, and where an original image is a printed image, it is very rate that a moare pattern is generated in the recorded image. On the other hand, the graininess is prominent in a bright image area and an evaluation of image quality is low. This problem is particularly prominent in a recording apparatus of a low recording density.

In the ink jet recording system, as means for suppressing the graininess, it has been proposed to provide two recording heads which discharge thick and thin inks of the same color system, respectively, and form bright to half-tone areas of the image by ink dots of the thin ink and form half-tone to dark area by ink dots of the thick ink.

FIG. 1 shows a perspective view of a main part of a prior art color ink jet recording apparatus of a serial print type which uses thick and thin inks.

Mounted on a carriage 706 are an ink tank Bkk which contains thick black ink, an ink tank Bku which contains thin black ink, an ink tank Ck which contains thick cyan ink, an ink tank Cu which contains thin cyan ink, an ink tank Mk which contains thick magenta ink, an ink tank Mu which contains thin magenta ink, an ink tank Yk which contains thick yellow ink, and an ink tank Yu which contains thin yellow ink. A recording head 702 is integrally attached to each of those ink tanks.

A recording medium 707 such as a recording sheet or a plastic thin sheet is held between a pair of feed rollers 705 and ejection rollers 703 and 704 and fed in a direction of an-arrow by the drive of a feed motor, not shown. The movement of the carriage 706 is guided by a guide shaft 708 and conducted by the drive of a carriage motor through a drive belt, not shown. A heat generating element (electro-thermal energy transducer) for generating thermal energy to discharge the ink is provided in an ink discharge port (liquid path) (not shown) of the recording head 702.

The heat generating elements are driven in accordance with a recording signal by a read timing of an encoder 709 as the carriage 706 is moved so that the ink droplets of the thick black, thin black, thick cyan, thin cyan, thick magenta, thin magenta, thick yellow and thin yellow inks are sequentially discharged and deposited onto the recording medium to form an image. A recovery unit having a cap is provided at a home position h of the carriage which is selected outside of a recording zone to maintain the stability of the ink discharge.

In such a prior art ink jet recording apparatus, it has been known that there are variations in the area of dot recorded by the ink droplet and the position of the record, among the discharge ports. As a result, stripes appear depending on the image information to be recorded.

This phenomenon is explained with reference to FIGS. 2 to 4.

FIG. 2 shows an image of basic image information of 50% half-tone recorded by dots of uniform area and exact positions.

FIG. 3 shows a recorded image of the 50% half-tone image when an area of a dot c recorded by the ink from a discharge port C is larger than a reference and an area of a dot f recorded by the ink from a discharge port F is smaller than the reference. In the image formnd by such dots, it tends to be whitey around the dot f and blackish around the dot c. Since the phenomenon occurs continuously, the stripe appears.

FIG. 4 shows a recorded image of the 50% half-tone image when the areas of the dots recorded by the inks from all of the discharge port (A–H) are uniform but the dot b recorded by the ink from the discharge port B and the dot d recorded by the ink from the discharge port D are shifted toward the dot c recorded by the ink from the discharge port C. In this case, since the space between the dot b and the dot c, and the space between the dot c and the dot d are narrower than the normal (dots e to f), they appear blackish. Further, since the space between the dot a and the dot b and the space between the dot d and the dot e are wider than the normal, they appear whitey. For this reason, a stripe again appears.

As the resolution is raised, those phenomena are difficult to be solved by improvement in the manufacture because they are due to a slight variation in the structure of the discharge ports. It is also difficult, in many cases, to equalize the conditions by controlling the variation between the discharge ports due to aging degradation of the discharge ports.

As an method for suppressing the prominence of the variation in the density due to the discharge ports, it has been proposed to irregularly set a condition such as an area of dots in a direction along which the dots are formed by one discharge port, that is, in a main scan direction, for each group of dots (hereinafter referred to as a column) which is formed by a plurality of discharge ports arranged vertically to the main scan direction. In this method, for the variation of the dot area, the stripe is less prominent because the distribution of the dot area is spread. Further, the dot spacing is also spread and the stripe due to the variation of the dot position is less prominent.

In the ink jet recording apparatus which records by using a plurality of inks of the same color system but different densities, a thick or dark area is usually formed by two inks of the same color system but different densities. Thus, the ink implantation amounts to almost 100% and the surface of the recording medium is fully covered. As a result, the variation of density due to the structure of the recording head such as the structure and arrangement of the discharge ports and the variation of the density due to the mechanical precision of the recording apparatus such as the sheet feed do not substantially appear. However, in the thin or highlight area, the variation of density appears as it does in the prior art.

Where eight recording heads are arranged for recording as they are in the above-mentioned example, it is very difficult to register or align the recording heads and a registration error is one of big causes of the variation of the density.

This variation of density appears more prominent in the multi-level recording with each pixel having a tonality than in the binary recording because the image is represented more smoothly in the multi-level recording. Accordingly, even if the variation of the density is same, the degradation of image in the multi-level recording appears more prominent than that in the binary recording and significant degradation of image may be caused in the multi-level recording.

SUMMARY OF THE INVENTION

In the light of the above problems, it is an object of the present invention to provide ink jet recording apparatus and method which provide a good image when it is recorded by using a plurality of inks of the same color system but different densities.

It is another object of the present invention to provide ink jet recording apparatus and method which can reduce visual variation of density in a low density area when the image is recorded by using thick and thin inks.

In order to achieve the above objects, the present invention provides an ink jet recording apparatus for recording an image by discharging ink to a recording medium from a recording head for discharging inks of the same color system but different densities from a plurality of discharge ports, comprising:

scan means for relatively scanning said recording head to said recording medium in a record mode; and control means for irregularly controlling areas of dots recorded on said recording medium by the ink discharged by said recording head as said recording head is scanned by said scan means when the image is to be recorded by using at least the ink of the lowest density of the inks having different densities.

The present invention further provides an ink jet recording method for recording an image by discharging ink to a recording medium, comprising the steps of:

providing a recording head for discharging inks of the same color system but different densities from a plurality of discharge ports;

relatively scanning said recording head to said recording medium in a record mode; and irregularly controlling areas of dots recorded on said recording medium by the inks discharged from said recording head as said recording head is scanned when the image is to be recorded by using at least the ink of the lowest density of the inks of different densities.

The present invention still further provides an ink jet recording apparatus for recording an image by using a recording head having a plurality of discharge ports for discharging thick ink and thin ink, respectively, comprising:

scan means for relatively scanning said recording head to a recording medium; and control means for randomly controlling volumes of the thin ink discharged from said recording head when the image is to be recorded by using the thin ink.

In accordance with the present invention, when the ink of a low density is to be discharged, the areas of dots recorded by the ink discharged from the respective discharge ports irregularly vary from port to port so that the variations are spread even if there are variations of the amount of discharged ink among the discharge ports.

BRIEF DESCRIPTION OF THE DRAWINGS

FIGS. 22C-1 to 22C-4 show drive signals of irregular waveforms when the divided blocks are driven.

DETAILED DESCRIPTION OF THE PREFERRED EMBODIMENTS

An embodiment of the present invention is now explained in detail with reference to the drawings.

Figure 5:
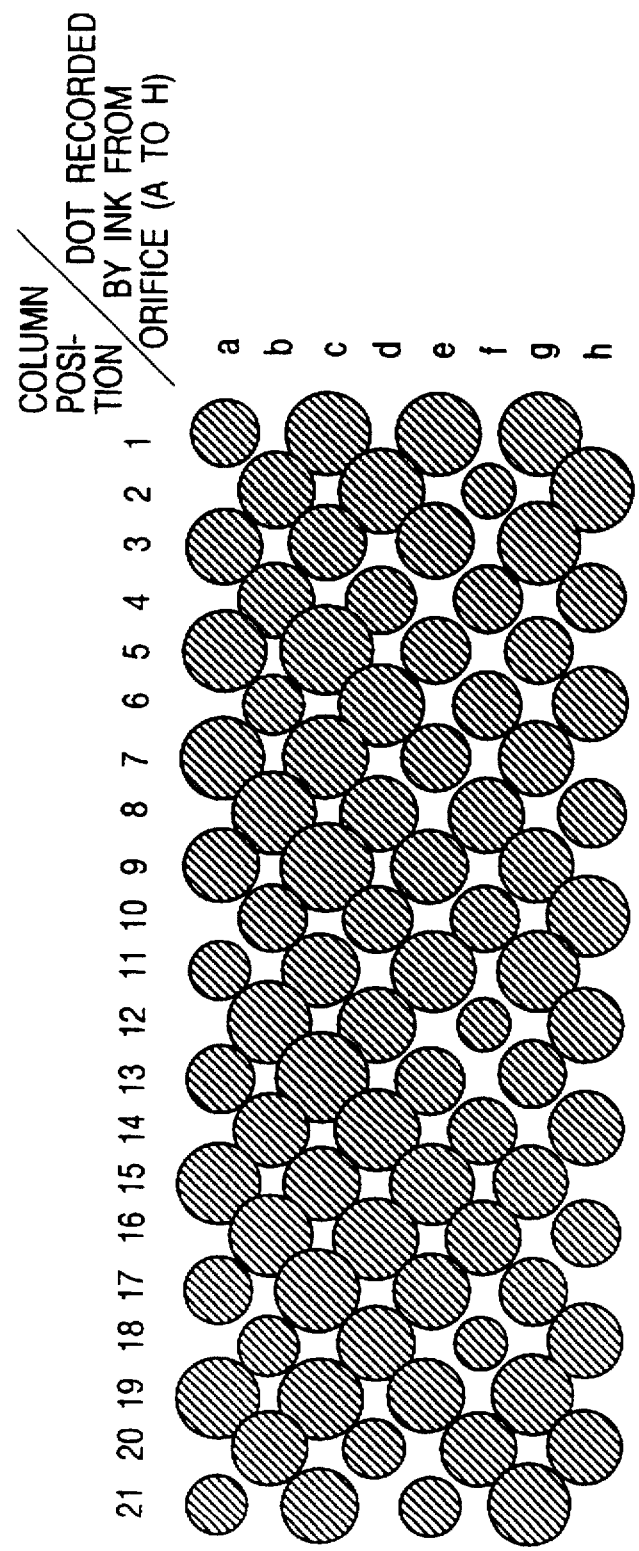
FIG. 5 shows a recorded image by an image forming method of an embodiment of the present invention.

The present embodiment adopts an ink jet recording system as a recording system. A recording system which uses the ink jet recording system, a structure of a recording head and a dot area modulation method are explained below prior to the description of the recording method of the present invention. FIG. 5 shows an example of a record recorded by a preferred recording method of the present invention. An embodiment of the present invention which allows such record will be described below.

(Ink jet recording apparatus)

Figure 6:
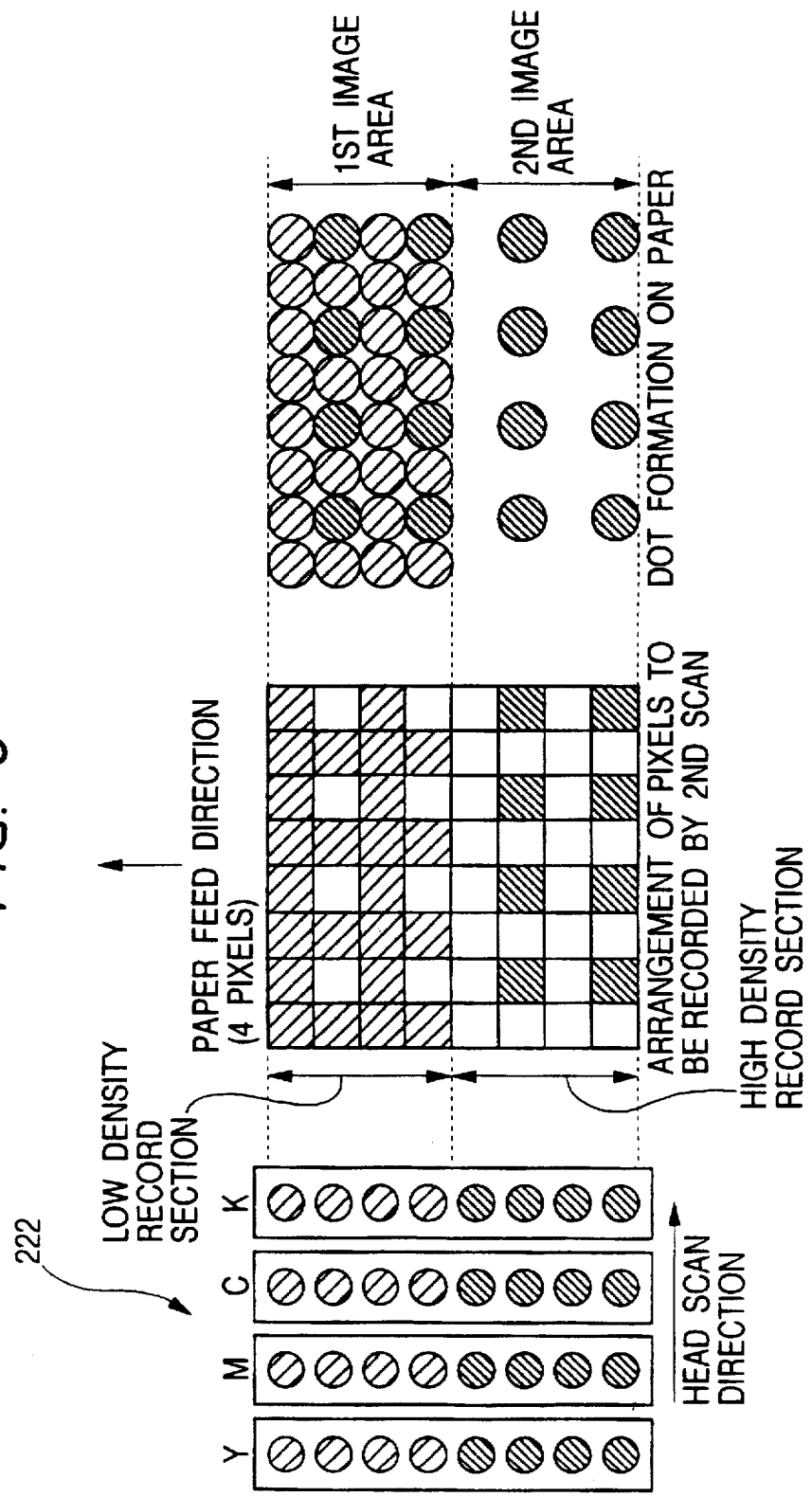
FIG. 6 shows a record state in the embodiment of the present embodiment.

FIG. 6 shows the dot arrangement in the present embodiment.

In the present embodiment, thick and thin inks are discharged (or ejected) from one recording head for each of the ink colors, and thick/thin heads for four colors, black, cyan, magenta and yellow are parallelly arranged and scanned for color recording in such a manner that the dots of the thick and thin inks for each color do not overlap on the same pixel.

Figure 12:
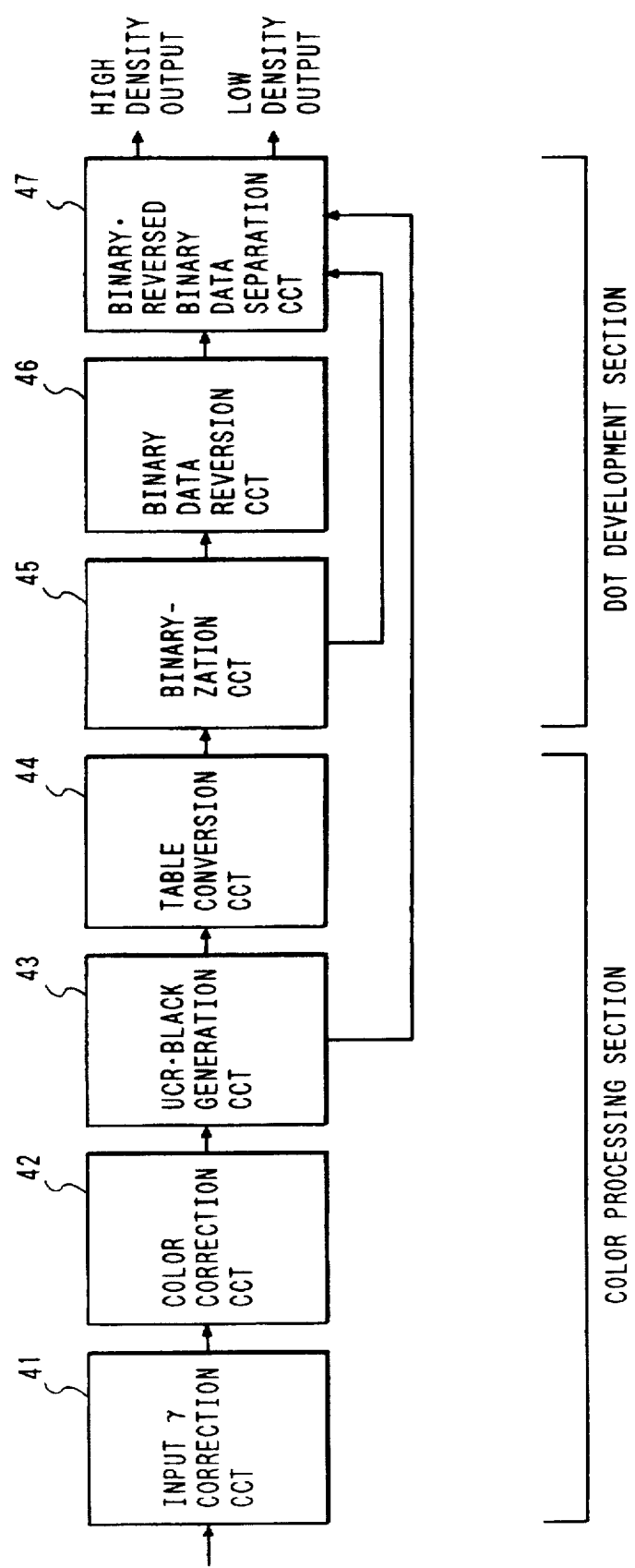
FIG. 12 shows a block diagram of a flow of image signal processing in the above apparatus.
Figure 13:
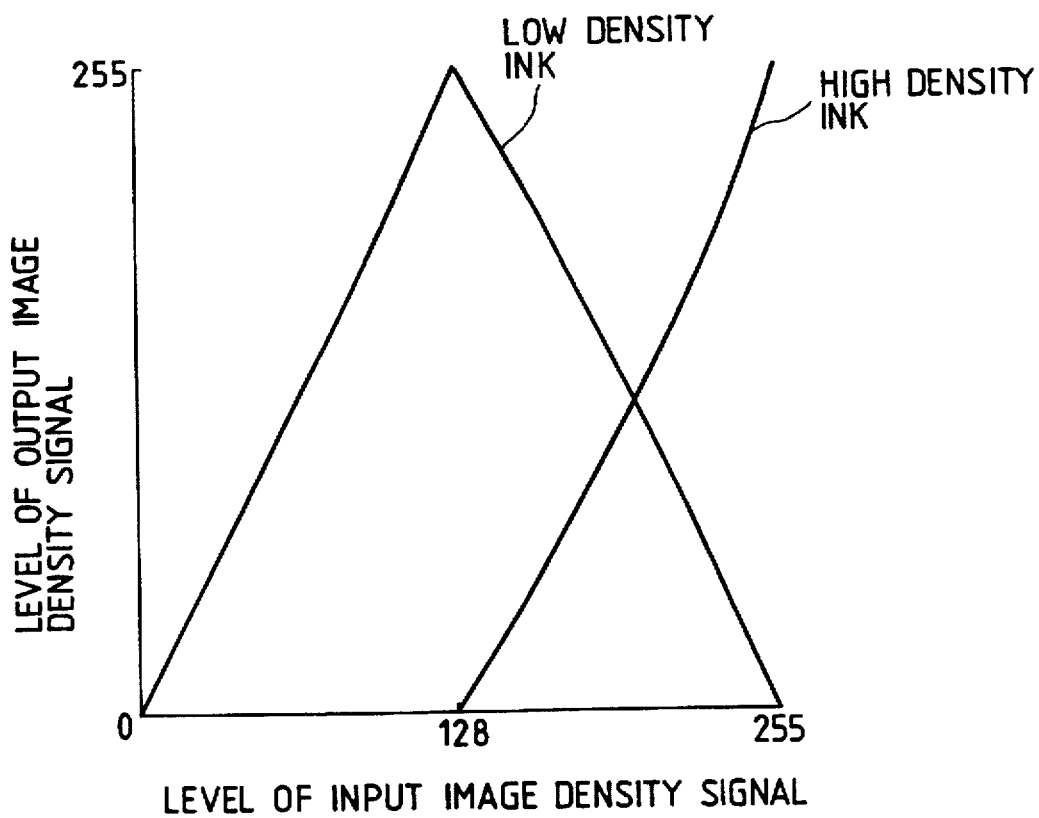
FIG. 13 shows a diagram of a content of a table conversion in FIG. 12.

For each scan of the recording head, the sheet is fed by one half of the discharge port pitch and image processing which will be described later in connection with FIGS. 12 and 13 is conducted so that a predetermined image area is recorded by the thick ink and the thin ink in sequence while the dots are prevented from being discharged onto the same pixel.

Figure 7:
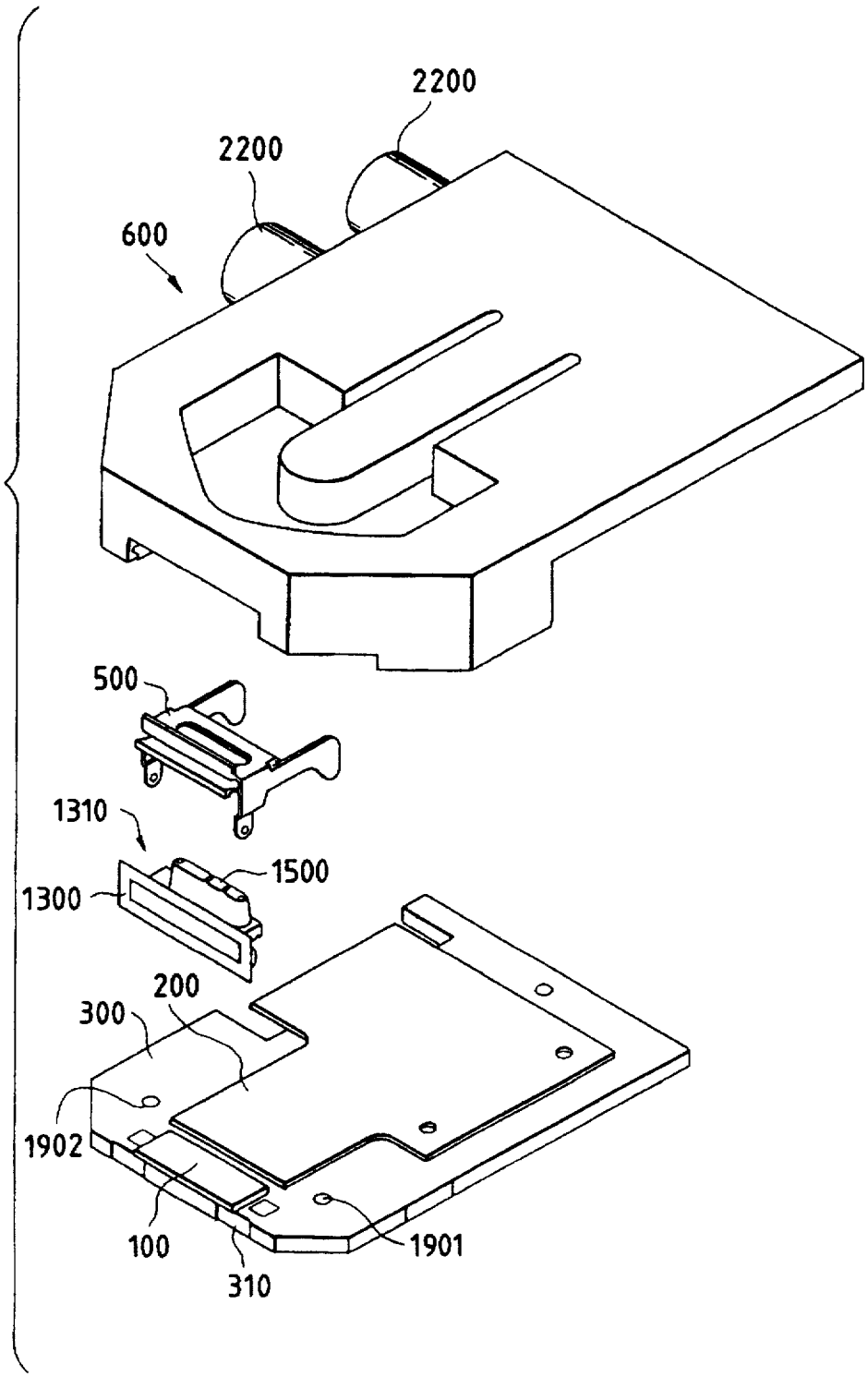
FIG. 7 shows a disassembled perspective view of a recording head used in the embodiment of the present invention.

FIG. 7 relates to one embodiment of the present invention and shows a disassembled perspective view of a recording head which discharges the thick and thin inks.

A pad which is interconnected to a wiring of a heater board 100 is provided at an end of a circuit board 200, and a plurality of pads for receiving electrical signals from the apparatus are provided at the other end of the circuit board 200. Thus, electrical signals from the apparatus are supplied to electro-thermal transducers on the heater board. A metal support 300 which supports a rear side of the circuit board 200 by a plane serves as a bottom plate of the ink jet unit. A retain spring 500 has a portion formed by folding a portion of a grooved top plate 1310 near an ink discharge area into a generally U-shape to linearly and resiliently press that portion, a pawl which engages with an escape hole formed in a base plate and a pair of rear legs which receive a force of the spring 500 by the base plate. The grooved top plate 1310 is press-contacted to the heater board 100 by the spring force. The attachment of the circuit board 200 to the support 300 is conducted by means of bonding by bonding material.

A filter 700 is provided at an end of an ink supply tube 2200. An ink supply member 6000 is formed by molding and a flow path member 1500 for guiding the ink into the recording head is integrally formed in the grooved top plate 1310. The ink supply member 600 is fixed to the support 300 by projecting two pins (not shown) from the rear side of the ink supply member 600 and passing them through holes 1901 and 1902 of the support 300 and thermally fusing them. They fill a clearance between an orifice plate 1300 and the ink supply member 600, pass through the groove 310 formed in the support 300, and fully fill a clearance between an orifice plate 1300 and a front end of the support 300.

Figure 8:
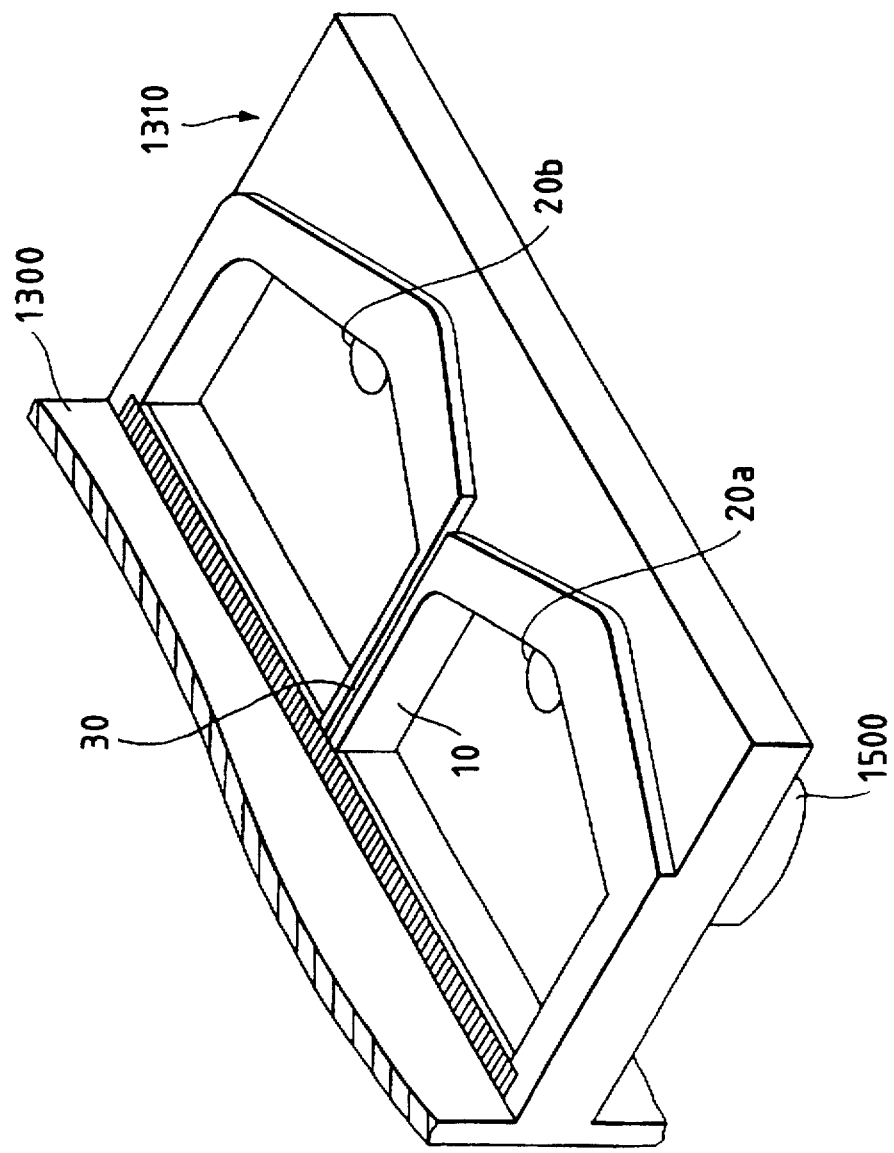
FIG. 8 shows a perspective view of a grooved top plate of the recording head as viewed from a junction to a heater board.

FIG. 8 shows a perspective view of the grooved top plate 1310 of the recording head used in the present embodiment as viewed from the heater board 100.

Two liquid chambers are provided for the thick and thin inks. Ink supply ports 20a and 20b formed in a flow path member 1500 open to the respective liquid chambers, and liquid paths, one for each discharge port, are provided in each liquid chamber facing the orifice plate 1300. A groove 30 is formed in a press-contact plane to the heater board 100 of a wall 100 partitioning the liquid chambers. The groove communicates with an outer periphery of the grooved top plate 1310. After the grooved top plate 1310 is press-contacted to the heater board, the outer periphery is sealed by sealant as described above. As the sealant is penetrated along the groove, the clearance between the grooved top plate 1310 and the heater board 100 is filled. The liquid chambers are thus perfectly separated by a known process used in the prior art recording head. The structure of the groove differs by the physical property of the sealant and it must be shaped to comply with the respective liquid chambers. By dividing the liquid chamber, it is possible for the ink discharge ports corresponding to the respective liquid chambers to discharge different inks. In the present embodiment, thick and thin inks are discharged from the integrally molded head shown in FIG. 8. By integrally molding, the positional relation between the thick and thin inks of the same color system can be precisely defined so that the drop precision (or land precision) is improved.

Figure 9:
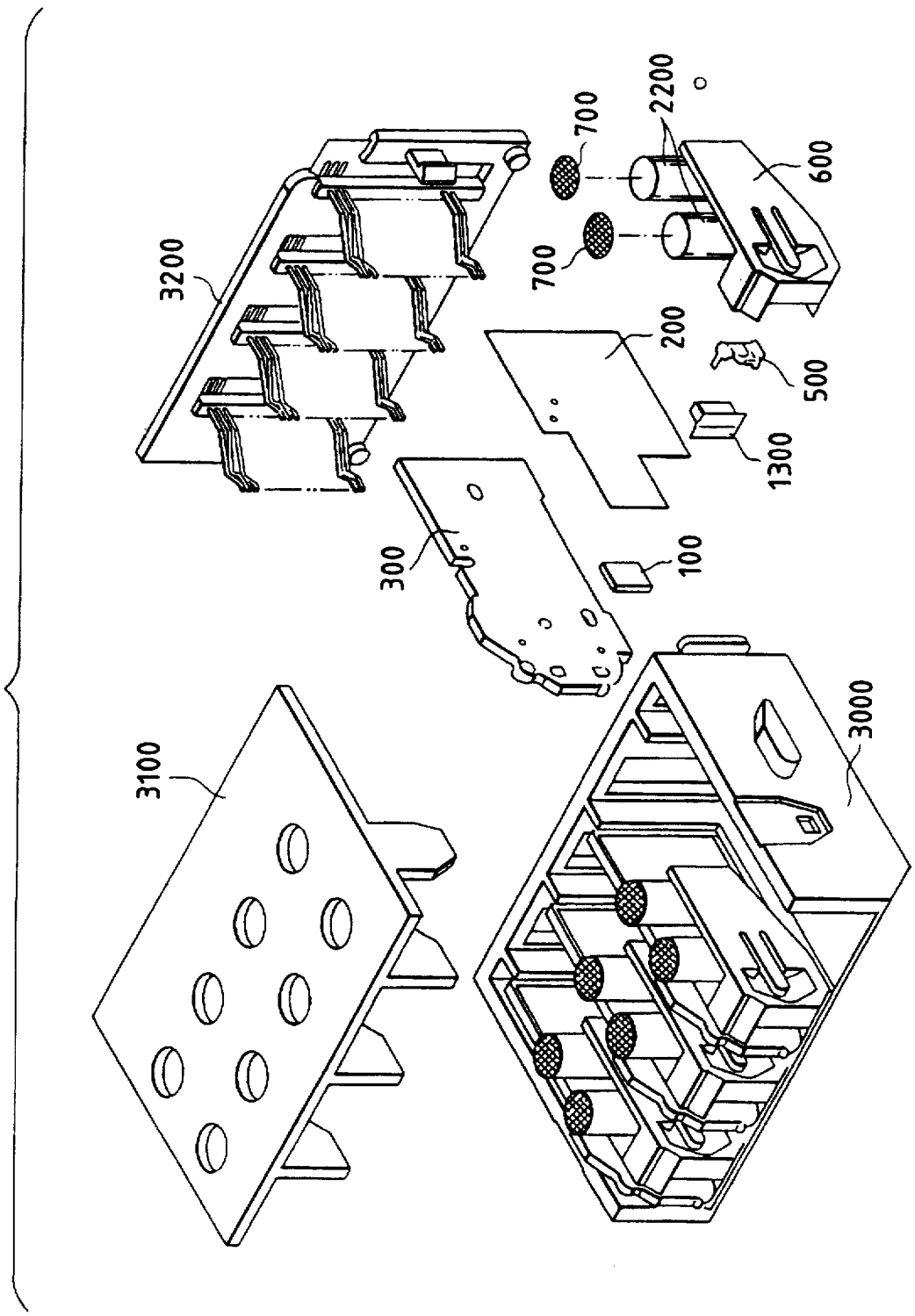
FIG. 9 shows a disassembled perspective view of a head unit having recording heads for four colors integrally formed.

FIG. 9 shows a disassembled perspective view of a structure of the integrated 4-head ink jet cartridge having the recording heads shown in FIGS. 7 and 8 for the thick and thin inks of the four colors K, C, M and Y integrally assembled by a frame 3000.

The four recording head are mounted on the frame 3000 at a predetermined pitch in the positions being adjusted along the line of the discharge ports. In the present embodiment, the adjustment is made by using a mechanical reference plane of the recording head to improve the drop position precision among the different colors. Alternatively, the precision may be improved by fixing the recording heads temporarily on the frame, discharging the inks and adjusting the relative drop positions among the colors on the basis of the measurement of the drop positions.

In FIG. 9, numeral 310 denotes a cover of the frame numeral 3200 denotes a connector for connecting electrical signals from the recording apparatus to the pads arranged on the circuit boards 200 of the four recording heads. The integral assembly of the four recording heads offers the advantages of easiness to handle and the improvement of the relative drop position precision among the recording heads and it is also effective in reducing the number of connections of the signal lines to the recording apparatus. For example, a signal line common to the four recording heads such as a GND line may be used in common to reduce the number of lines. Further, an integrated circuit board may be used and the recording heads may be driven in time shared fashion, so that the recording signal line may be shared. Such reduction in the number of the electrical connections is effective in the apparatus having a large number of signal lines such as a color recording apparatus or a multi-discharge port high speed recording apparatus, and it is particularly effective to the thick/thin ink jet recording apparatus of the present embodiment.

Figure 10:
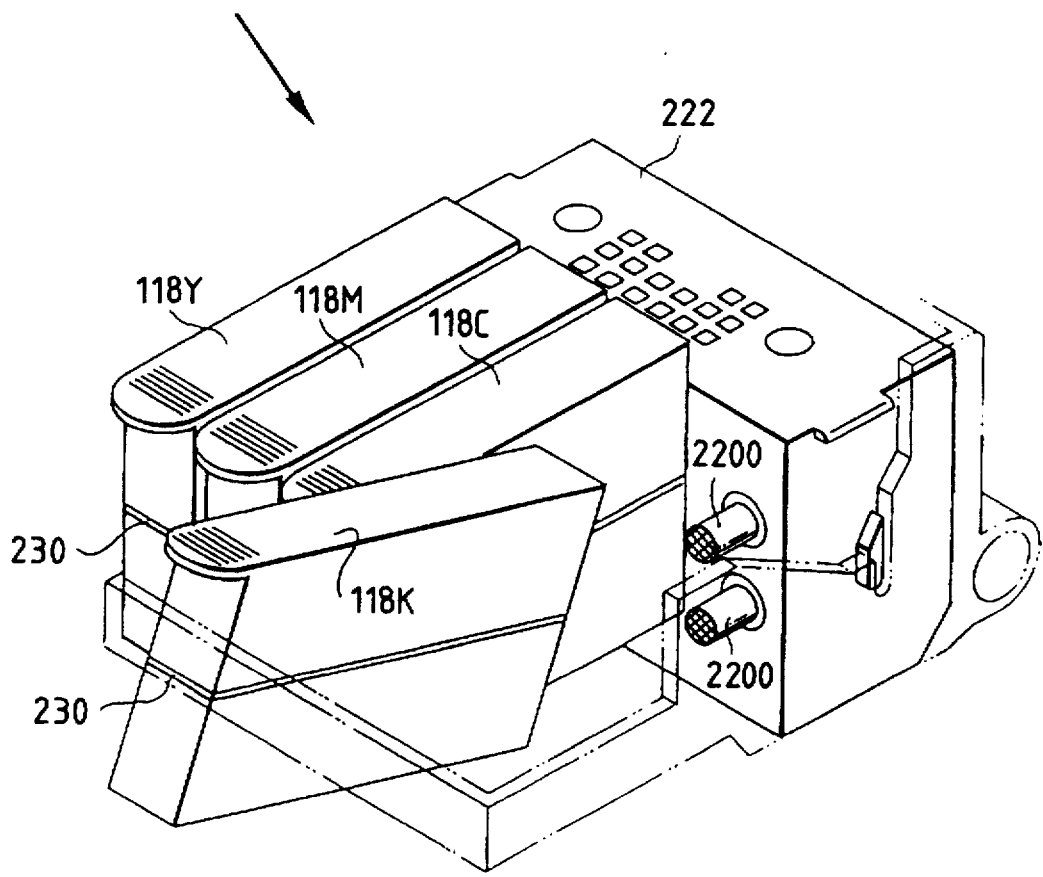
FIG. 10 shows a perspective view with the head unit and the ink tank being mounted on a carriage.

FIG. 10 shows a perspective view when the four-head integrated ink jet cartridge 222 is mounted on the carriage to conduct the record scan.

Each of ink tank 118K, 118C, 118M and 118Y is sectioned into two upper and lower chambers by a partition 230 and the upper ink chamber is filled with the thin ink and the lower ink chamber is filled with the thick ink. The ink tanks for the four colors are coupled to an ink jet cartridge 222 on the carriage with two ink supply tubes 2200 being connected to the sectioned ink chambers to supply the thick ink and the thin ink, respectively. In the present embodiment, the thick and thin inks are filled in the integral ink tank and the ink tanks for the four colors are integrated into the head cartridge so that the inconvenience in handling the thick/thin recording is solved.

Figure 11:
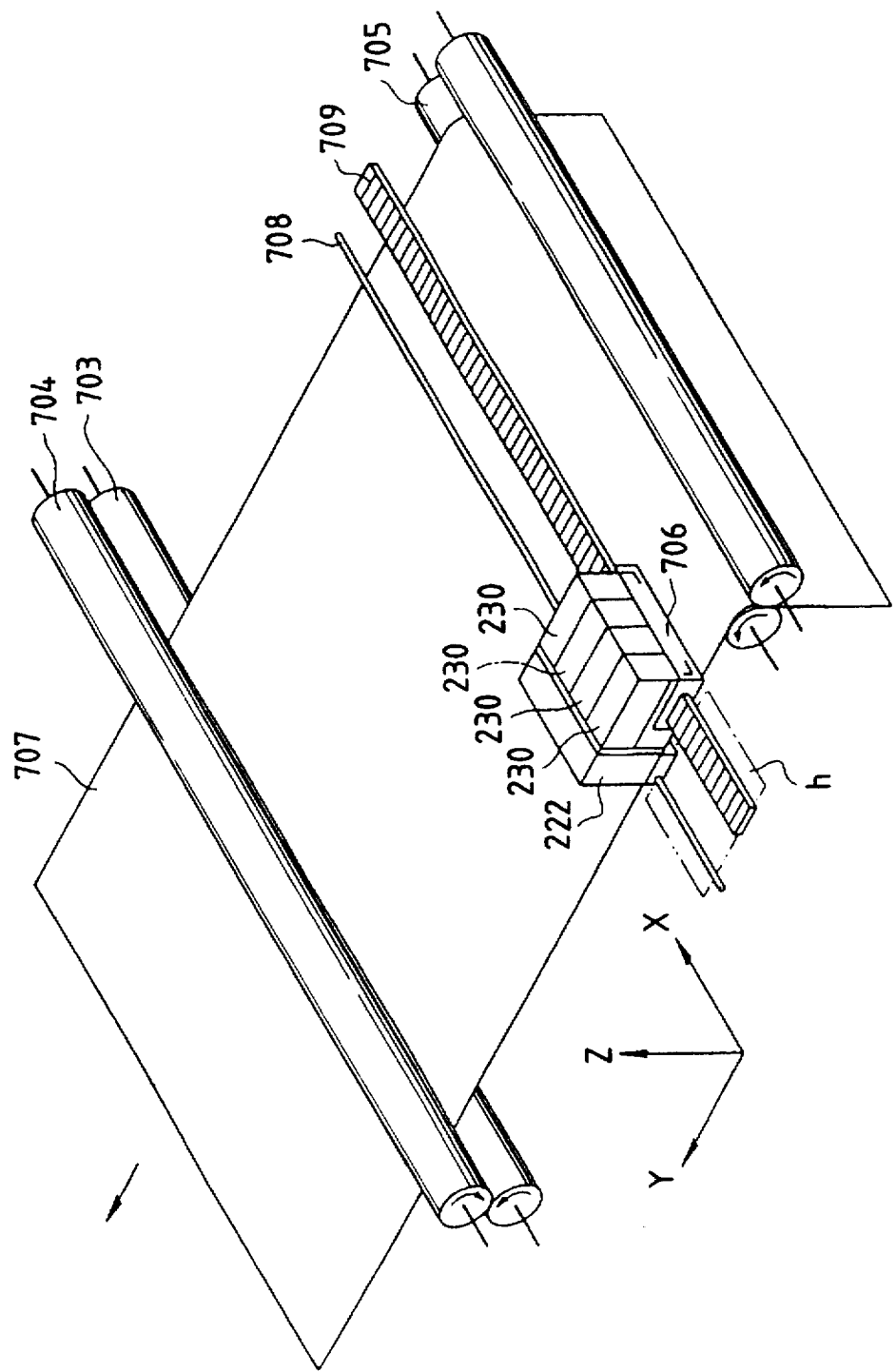
FIG. 11 shows a schematic perspective view of an ink jet recording apparatus used in the embodiment of the present invention.

FIG. 11 shows a perspective view a main part of the ink jet recording apparatus which used the above recording head unit.

In FIG. 11, mounted on a carriage 706 is an ink jet cartridge which integrates therein four ink tanks filled with thick and thin inks of four colors, black, cyan, magenta and yellow, and four recording heads for discharging four thick and thin inks from upper and lower lines of discharge ports, respectively. A basic operation of the ink jet recording apparatus of the present embodiment is similar to that of the prior art apparatus described above but it is described again below.

Numeral 703 denotes a sheet feed roller which is rotated in a direction of an arrow while it imparts a tension to a recording sheet 707 together with an auxiliary roller 704 to transport the record sheet 707 in the Y direction. Numeral 705 denotes a feed roller which feeds the recording sheet and also serves to apply a tension to the recording sheet 707 as the roller 703 and 704 do. In a non-record mode or during a discharge recovery operation of the recording heads, the carriage 706 stands by at a home position h shown by a broken line.

When a start of record command is issued to the carriage 706 which is at the home position h prior to the start of record, it starts to move in the X direction along a carriage guide shaft 708. As it moves, the thick and thin inks of the four colors are discharged from the upper and lower thick and thin discharge port lines of the recording unit 222 in accordance with the recording signal, on the basis of a read signal from a linear encoder 709. Thus, a record is made on the record sheet 707 by the width of the thick and thin discharge port lines.

When the recording to the end of the record sheet is completed, the carriage 706 returns to the home position through the opposite movement to that described above and it again scans in the X direction to conduct the same record operation. While the carriage 706 returns to the home position, the sheet feed roller 703 is rotated in the direction of arrow so that the sheet is fed in the Y direction by one half of the thick/thin discharge port line width. In this manner, the recording and the sheet feed by the thick/thin discharge port line width are repeated for each scan of the carriage 706 to make the record of the predetermined width.

(Image processing)

FIG. 12 shows a block diagram of a configuration of the image processing in the present embodiment and it shows a sample of a flow of image signal processing for generating binary data for recording by the C, M, Y and Bk thick inks and binary data for recording by thin inks based on R, G and B brilliance signals.

In FIG. 12, an input γ correction circuit 41 converts a red brilliance signal R, a green brilliance signal G and a blue brilliance signal B to a cyan image density signal C, a magenta image density signal M and a yellow image density signal Y in accordance with a characteristic of an input device.

A color correction (masking) circuit 42 and a black generation and underlying color removal (UCR) circuit 43 convert the γ-corrected C, M and Y density signals to the C, M, Y and Bk density signals to match an input image to an output image.

A table conversion circuit 44 matches the color-processed C, M, Y and Bk density signals to a characteristics of an output device (output medium) and converts them to the C, M, Y and Bk density signals.

A binarization circuit 45 converts the table-converted multi-level C, M, Y and Bk density signals to C, M, Y and Bk binary signals.

A binary data inversion circuit 46 generates inverted binary signals of the C, M, Y and Bk binary signals.

A binary/inverted binary supply circuit 47 refers to the color-processed C, M, Y and Bk density signals and supplies the binary signals of the C, M, Y and Bk signals and the inverted binary signals to the record data for the thick ink and the record data for the thin ink, respectively, when the density signals are above a predetermined level, and supplies the binary C, M, Y and Bk signals and a binary signal '0' (which is a binary signal which does not cause the dot impaction) to the record data for the thick ink and the record data for the thin ink, respectively, if the density signals are below the predetermined level.

The table conversion during the process converts the input image density signal level to the output image density level as shown in FIG. 13. As shown therein, the data is converted to record by only the thin ink when the input signal level is 0 to 128, and data is converted to record by the thin ink and the thick ink when the input density signal level is 129 to 255.

However, since the sum signal level of the thin ink output density signal level and the thick ink output density signal level to the input signal of levels 129 to 255 is always equal to 255, the inversion of the binary signal of the thin ink output density signal level represents the thick ink binary signal, and the inversion of the binary signal of the thick ink output density signal level represents the thin ink binary signal. Accordingly, for the input density signal levels 129 to 255, the print data for the thick ink and the record data for the thin ink can be generated by the mere table conversion to the thin ink input density signal level or the table conversion to the thick ink input density signal level.

For the input image signal level for recording by using two inks of the same color system but different densities, the output image signal is calculated by using the input image signal level for one of the inks. The binarized result of the output image signal is used as the output binary signal for that ink and the inverted binary signal is used as the output binary signal for the other ink. As a result, in an area in which recording is made by using two inks of the same color system but different densities, the positions of the two inks do not overlap at the same position whatever binarization process may be used and the amount of implantation is 100% in the density area in which the recording is made by using the two inks of different densities, so that the variation of density is substantially non-prominent.

As explained in connection with FIG. 6, the image area is main-scanned in the state that the thick ink discharge port precedes to the thin ink discharge port, and the thick ink is first discharged and drops on the sheet to form a dot. Then, the sheet is fed in the sheet feed direction by four-pixel length and the thin ink is discharged while the thin ink discharge port main-scans the image area which has previously been main-scanned by the thick ink discharge port, and it drops on the sheet to form a dot. The recording pixel arrangement of the thick ink which first drops and the recording pixel arrangement of the thin ink which subsequently drops are in a complementary relation because of the image signal processing described above, and they do not drop at the same position. Accordingly, a uniform image is produced on the sheet.

(Ink setting)

When the recording is made by using inks of the same color system but different densities, the dye densities of the inks are set in the following manner. First, a dye density at which the density on the image is maximum is determined and then a dye density at which a density change on the image is constant is selected.

Figure 14:
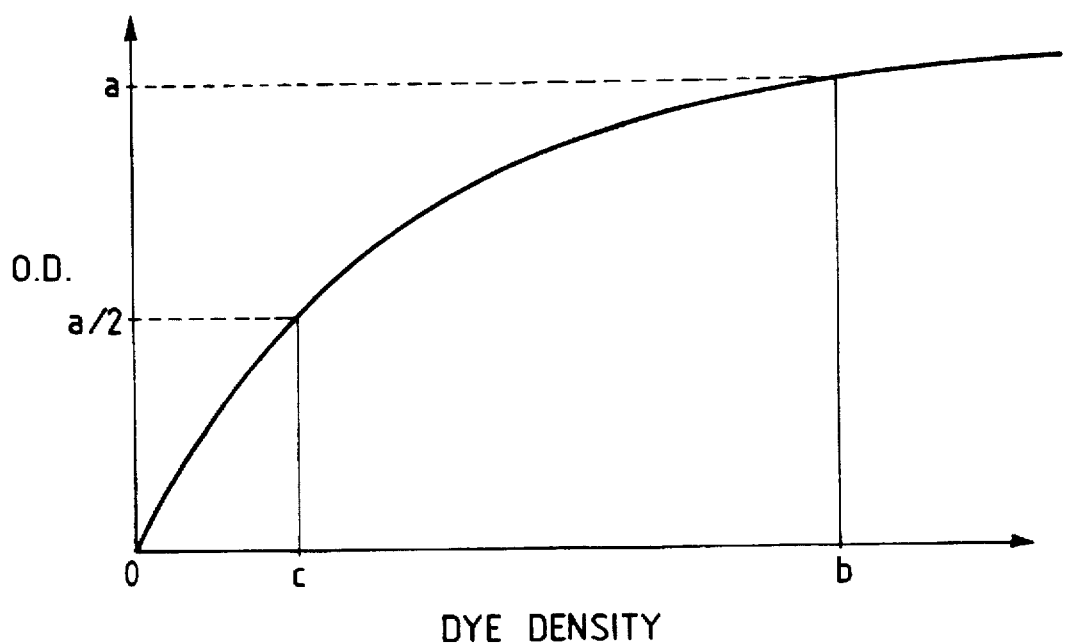
FIG. 14 shows a diagram of a relation between a dye density of the ink and an optical density of a recorded image of 100% duty factor.

A dye density at a given condition and an optical density of the image recorded thereby have a relation as shown in FIG. 14. Above a certain dye density b, the optical density is substantially constant and further increase of the dye density does not substantially affect to the optical density. Thus, the highest density of the ink in the ink setting is set to the dye density b at which the increase of the image density stops as the dye density increases.

At the ink setting of the other inks, for example, when two thick and thin inks are used and the thin ink is to represent up to one half of the image density recorded by the thick ink, the thin ink is set to the dye density c.

Figure 15:
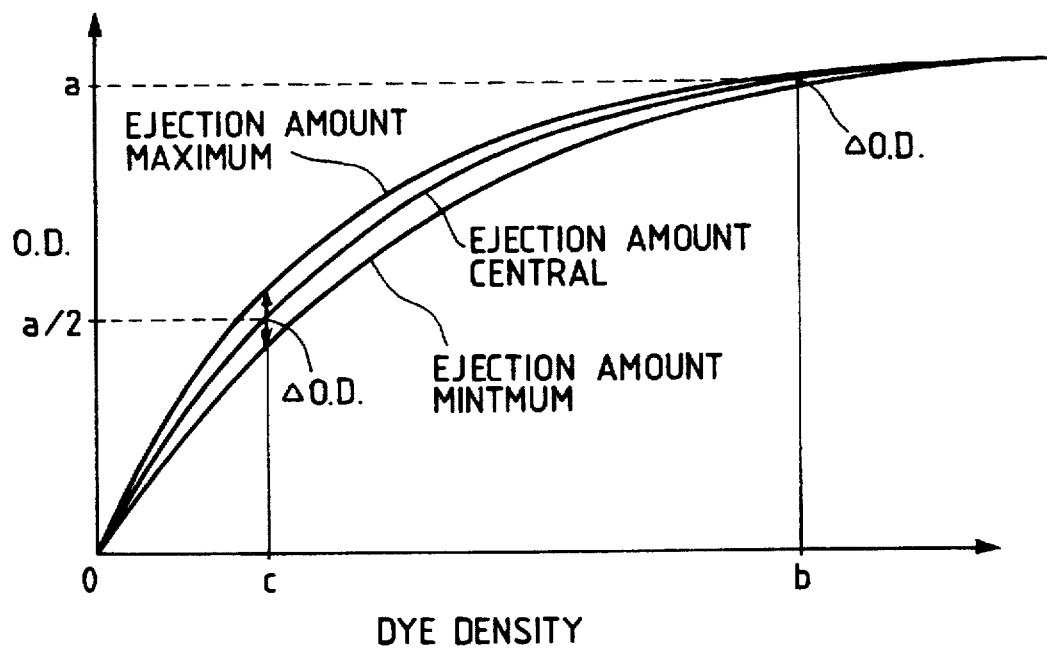
FIG. 15 shows a diagram of a relation between the dye density of the ink and the optical density of the recorded image of 100% duty factor for recording heads of different amounts of discharge.

FIG. 15 shows a diagram of a relation between the dye density and the optical density when the discharge amount varies.

As seen from FIG. 15, the change of the optical density due to the variation of the discharge amount is not big at the dye density b, but the change of the optical density due to the variation of the discharge amount is relatively big at the dye density c.

When the ink of the dye density in the area in which the variation of the discharge amount causes a big variation of the optical density is to be discharged, an image forming method to be described later is used to produce a uniform image without variation of density.

(Causes of variation among discharge ports)

There are variations in the resistance and the surface state of the heat generating elements of the recording heads. As the resistance varies, the heat generation temperature of the heater varies and the manner of bubble generation of the ink differs from discharge port to discharge port. As a result, variations are included in the ink discharge amount and the discharge speeds and hence variations are included in the areas and the shapes of dots formed.

Depending upon unevenness on the fine surface of the heater, variations are included in the position of a number of fine bubbles in an early stage of the ink bubble generation and in the start time of bubble generation and variations are finally included in the shape of dots.

When the variations are included in the shape and diameter of the discharge port, the discharge direction varies if the shape varies, and the discharge amount and the discharge speed vary if the diameter varies.

In addition, in the relation between the heater board on which the heat generating elements are formed and the top plate, the discharge direction varies if the position of the heat generating elements and the position of the discharge port vary, and the interference between the discharge ports varies if the high pressure state in the liquid path during the bubbling varies as the contact state varies. Those factors may cause the variation of the discharge condition.

Causes of the variations of the state between the discharge ports caused by the use of the recording head are now explained.

The wetness between the ink and the material of the discharge port and the liquid path changes as they are used, so that the discharge port becomes to fit to the ink and the discharge characteristic is improved. As a result, there occur differences in the dot diameters and the flying distances between the frequently used discharge port and the less frequently used discharge port, which may cause a variation in the density. As the recording head is used, the ink is deposited by burning on the heater surface or the stress due to the cavitation during the bubble extinguishment is applied to the heater surface, which may deteriorate the surface. In such a case, variation is included in the deterioration state and hence the variation is included in the discharge amount.

It is difficult to adjust the variation of the discharge by the discharge control when the variation is due to the aging variation of the discharge port.

(Dot Area Modulation Method)

A dot area modulation method used in the image formation method to be described later is now explained.

The dot area is determined by the amount of ink discharged. The discharge amount may be changed by the bubble volume of the ink. The bubble volume is generally larger as the number of ink molecules which cause phase transition by heat increases. As the discharge control to efficiently increase the number of molecules, the following double pulse drive has been known. In this method, a pulse (pre-pulse) which generates thermal energy of a level which does not cause the bubbles is applied, the head is left for a period during which the heat is diffused to other ink (pulse off time) to increase the number of molecules which are easy to cause the phase transition, and then a pulse (main pulse) for generating a thermal energy large enough for discharge is applied so that the ink with the increased bubble volume is discharged. By controlling the off time between the pre-pulse and the main pulse, the number of ink molecules which are easy to cause the phase transition is controlled and the ink discharge amount is controlled.

Figure 16:
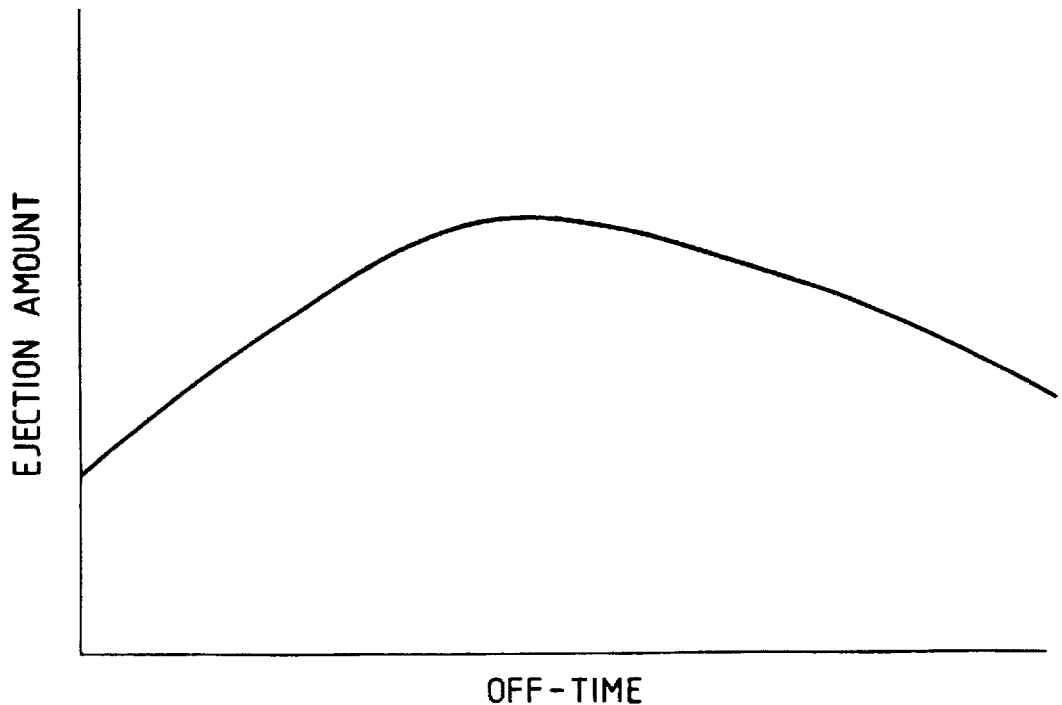
FIG. 16 shows a relation between a waveform off time in a drive waveform of the recording head used in the embodiment of the present invention and the amount of ink discharged.

FIG. 16 shows a correlation between the off time and the discharge amount. As seen from FIG. 16, as the off time is increased, the discharge amount increases. The detail thereof is described in the U.S. patent application Ser. No. 921,832 filed on Jul. 30, 1992 by the assignee of the present invention.

(Image Forming Method)

An image forming method in the present embodiment is now explained.

In the present embodiment, when the recording is made by using only the thin ink, that is, when the areas of the input image density signal level of 1 to 128 is recorded, the dot area is irregularly varied for each record column, that is, a group of dots recorded by the ink from the discharge ports arranged normally to the main scan direction of the recording head, to form the image.

Figure 3:
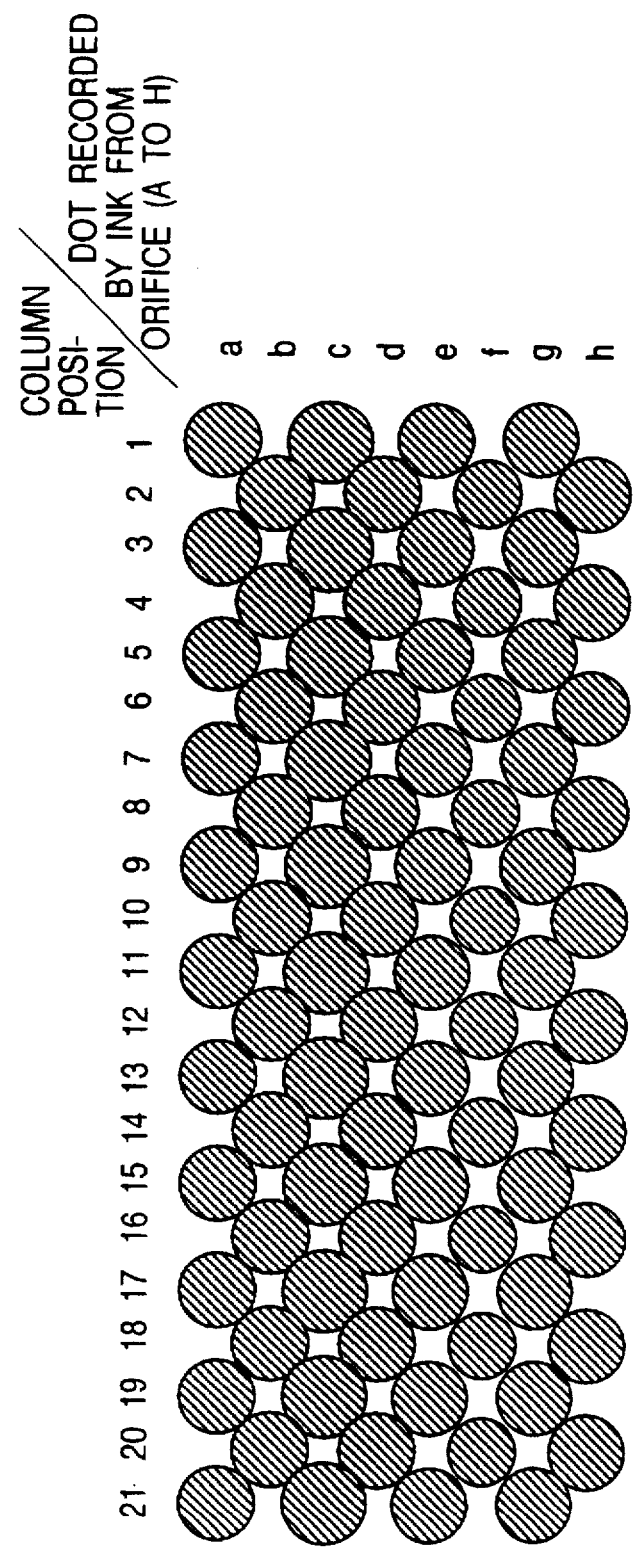
FIG. 3 shows a recorded image of 50% duty factor when a variation is included in a dot diameter in a prior art image forming method.
Figure 17:
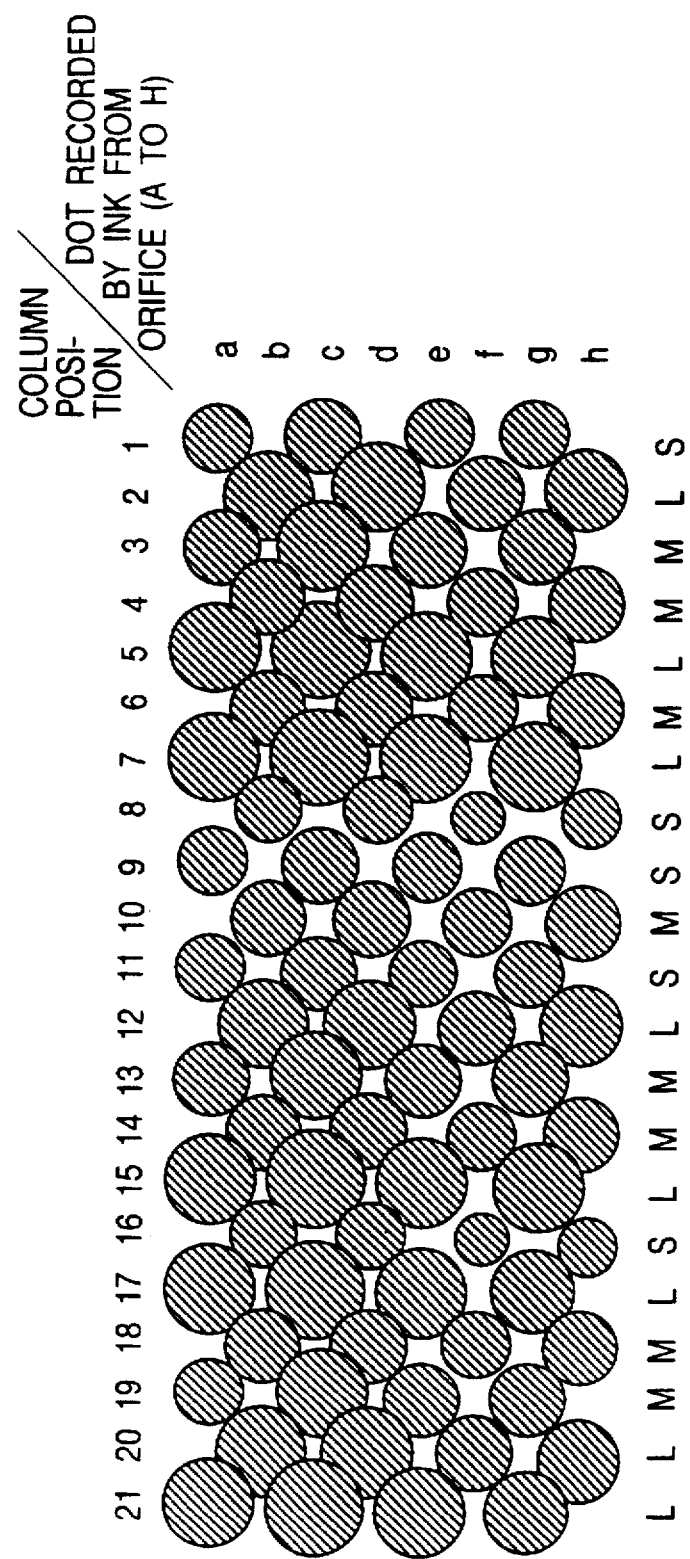
FIG. 17 shows a recorded image when the recording method of the embodiment of the present invention is applied to the recording head having the characteristic shown in FIG. 3.

FIG. 17 shows the irregular arrangement of the dots when the recording head which causes the variation in the dots shown in FIG. 3 is used. Namely, for each column, columns L providing larger dot areas than a reference, columns S providing smaller dot areas than the reference, and columns M providing the reference dot areas are irregularly arranged. In the illustrated example, 21 columns, the columns 1 to 21 are arranged with irregular dot areas as shown below. Namely, starting from the column 1, they are arranged.

SLMKLMSSMSLMMLSLMMLL

In the present image forming method, the continuity of the variation of the dots disappears and the stripe is hard to visually recognize. Further, since the dots of different areas appear irregularly, the continuous formation of the dots of the same area in the main scan direction is avoided whatever the image is thinned in accordance with the record density.

Figure 18:
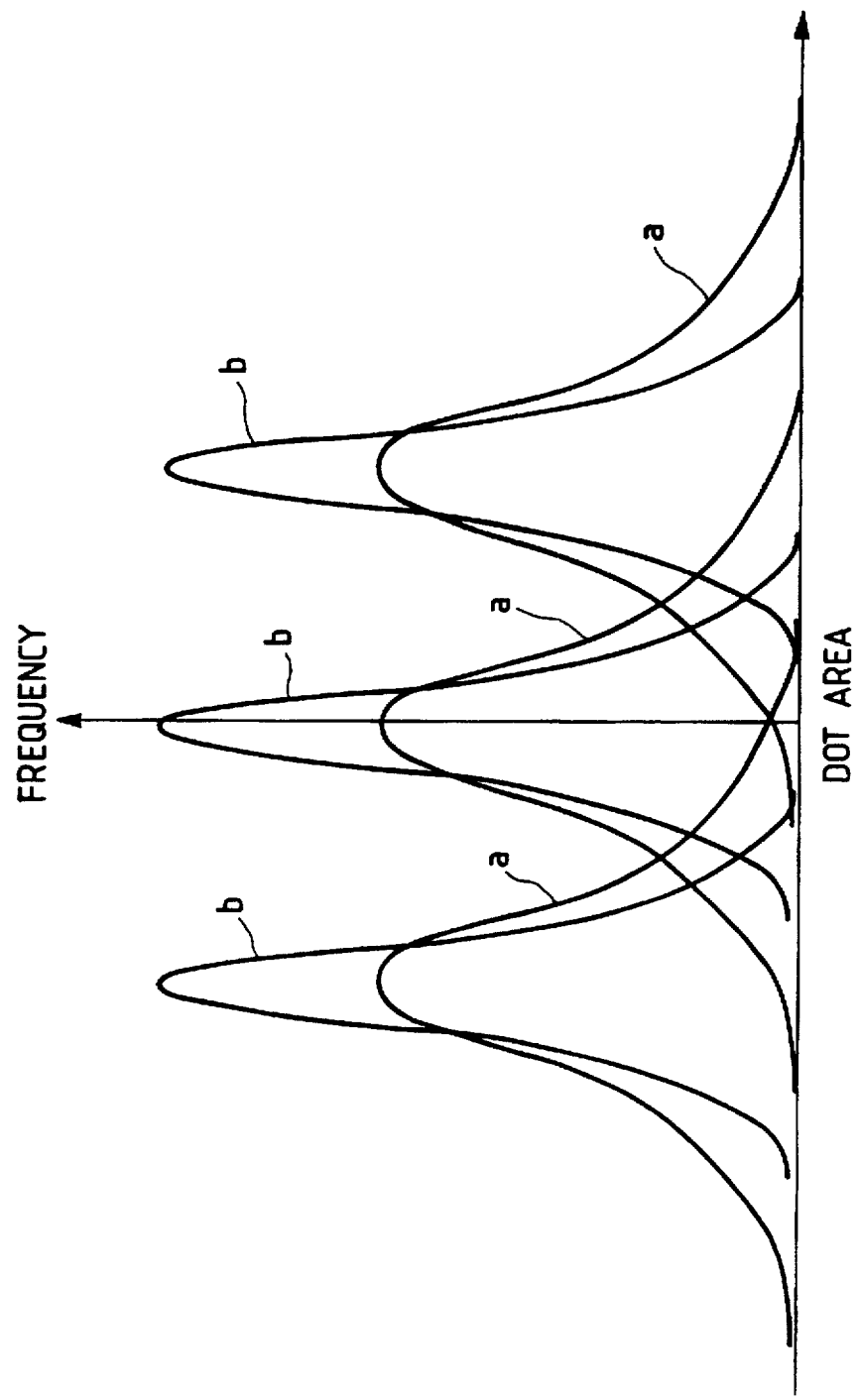
FIG. 18 shows a diagram of a distribution of variation of dot area of each discharge port to illustrate an effect of the embodiment of the present invention.

FIG. 18 shows the distribution of the dot area for each of three discharge ports, which is one of the causes of the variation.

In FIG. 18, a curve b shows a distribution of the dot area when the recording is made by a prior art drive method. As seen from FIG. 18, the frequency of the discharge of the dots of the same area among the discharge ports is extremely smaller than that of the center value of the dot area of the respective discharge ports. This is the cause of the variation of the density.

When the dot areas are irregularly varied in accordance with the present embodiment, the distribution changes as shown by as curve a. The frequency of the discharge of the dots of the same area among the discharge ports relatively increases. In this case, the variation of the density is spread among the discharge ports and it becomes less prominent. The range within which the dot areas for each column is to be varied should be selected by taking into consideration a balance between the overlap of the frequency at which the dots of the same area are discharged among the discharge ports and the range of variation of the dot areas by all discharge ports.

The quality of image which may otherwise be degraded by the feeling of roughness of the image due to the irregular variation of the dot areas in accordance with the above image forming method can be improved by limiting the irregular variation of the dot areas. In one limitation method, when the dot area modulation for each column is changed in n ranks, a combination of n stages of columns is predetermined in a unit comprising n columns and such column units are irregularly arranged.

Figure 19:
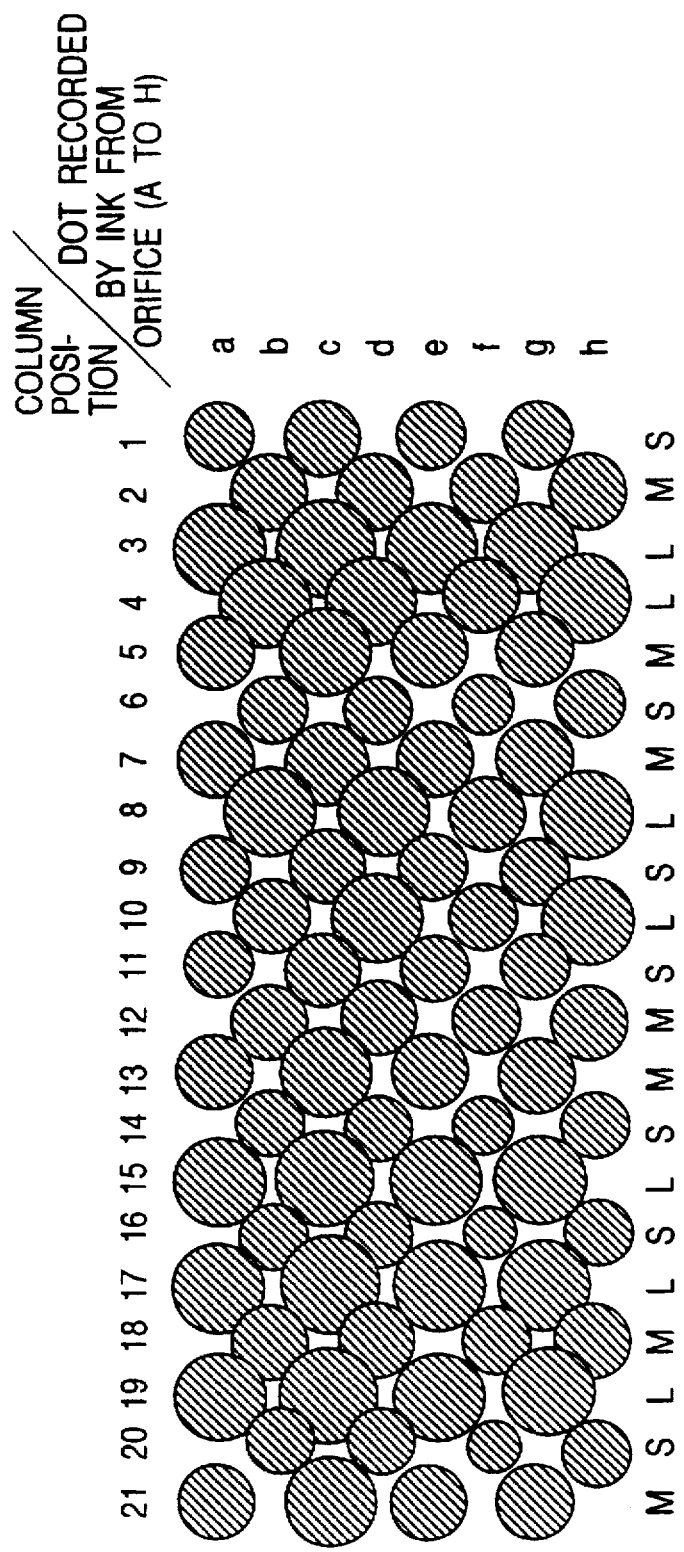
FIG. 19 shows a diagram of a recorded image when the recording method of another embodiment of the present invention which uses a driving method shown in FIG. 16 is applied to the recording head having the characteristic shown in FIG. 3.

FIG. 19 shows an image when a limitation is imparted to the irregular variation. A dot area modulation having 3-stage rank is applied to the recording head which causes the variation shown in FIG. 3.

In FIG. 19, the column L represent one which provides a larger dot area than a reference, the column S represents one which provides a smaller dot area than the reference and the column M represents one which provides the reference dot area. The combination of the three stages is limited to the following six combinations:

SML, SLM, MSL, MLS, LSM, LMS

Figure 4:
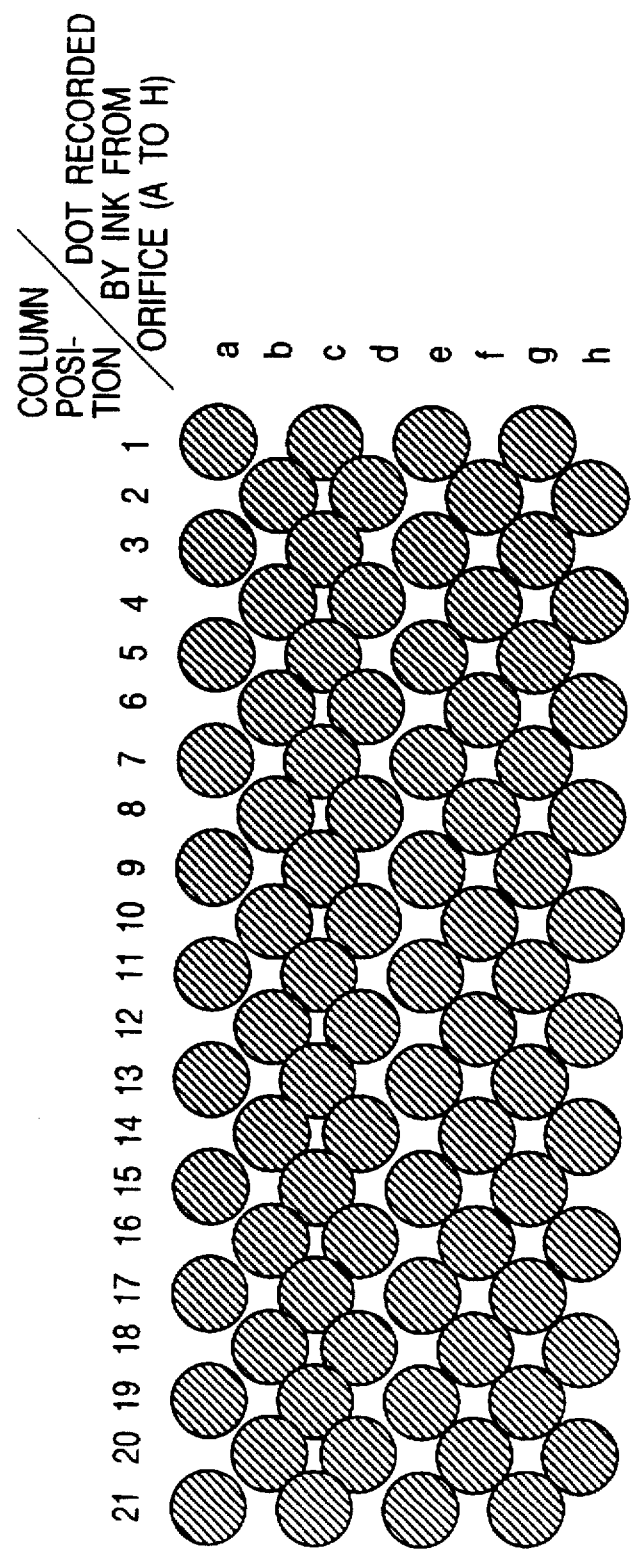
FIG. 4 shows a recorded image of 50% duty factor when a variation is included in a dot drop position in the prior art image forming method.
Figure 20:
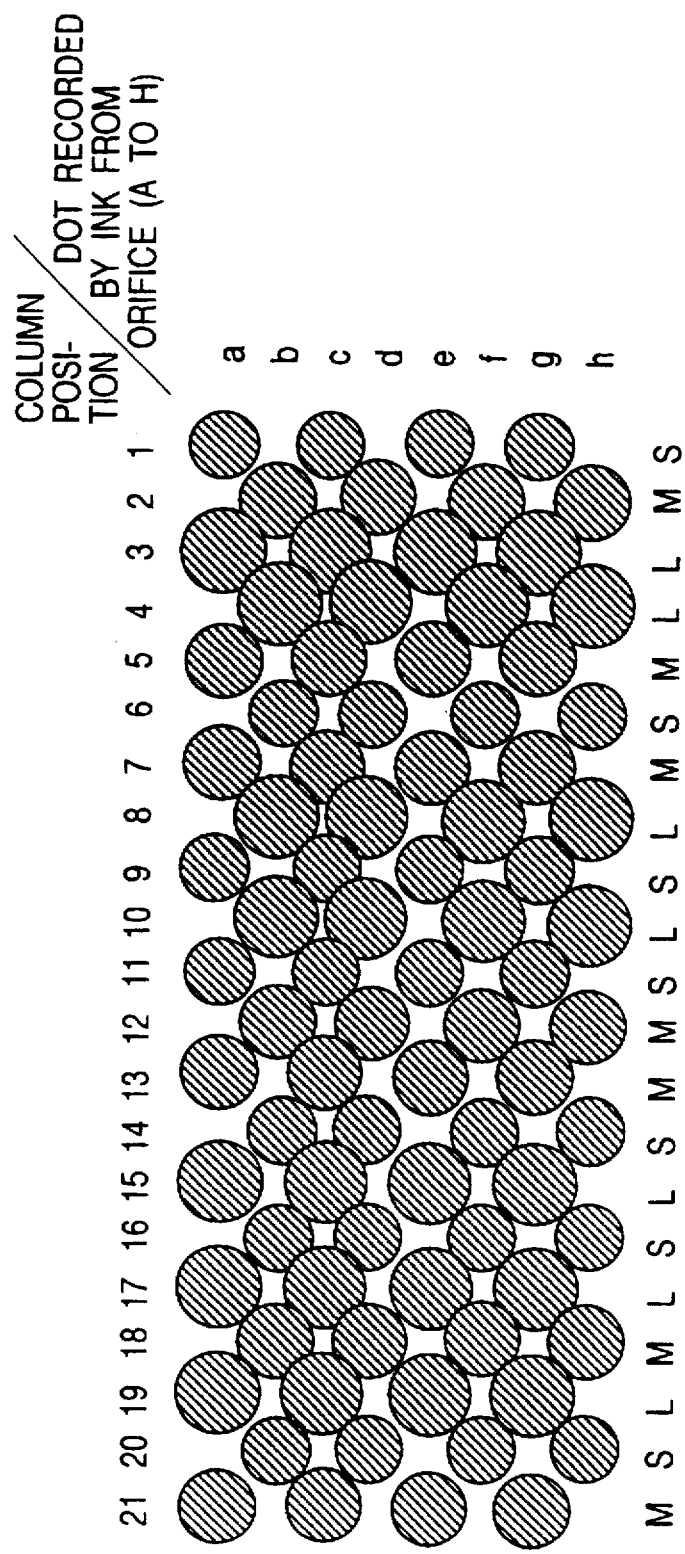
FIG. 20 shows a diagram of a recorded image when other embodiment of the present invention which uses the driving method shown in FIG. 16 is applied to the recording head having the characteristic shown in FIG. 4.

Those six combinations are irregularly generated. In the illustrated example, the image is formed by the following sequence starting form the column 1:

SML, LMS, MLS, LSM, MSL, SLM, LSM

Where there is a variation in the dot drop positions as shown in FIG. 4, the stripe is less prominent by forming the image by imparting the above limitation as shown in FIG. 20.

Figure 21:
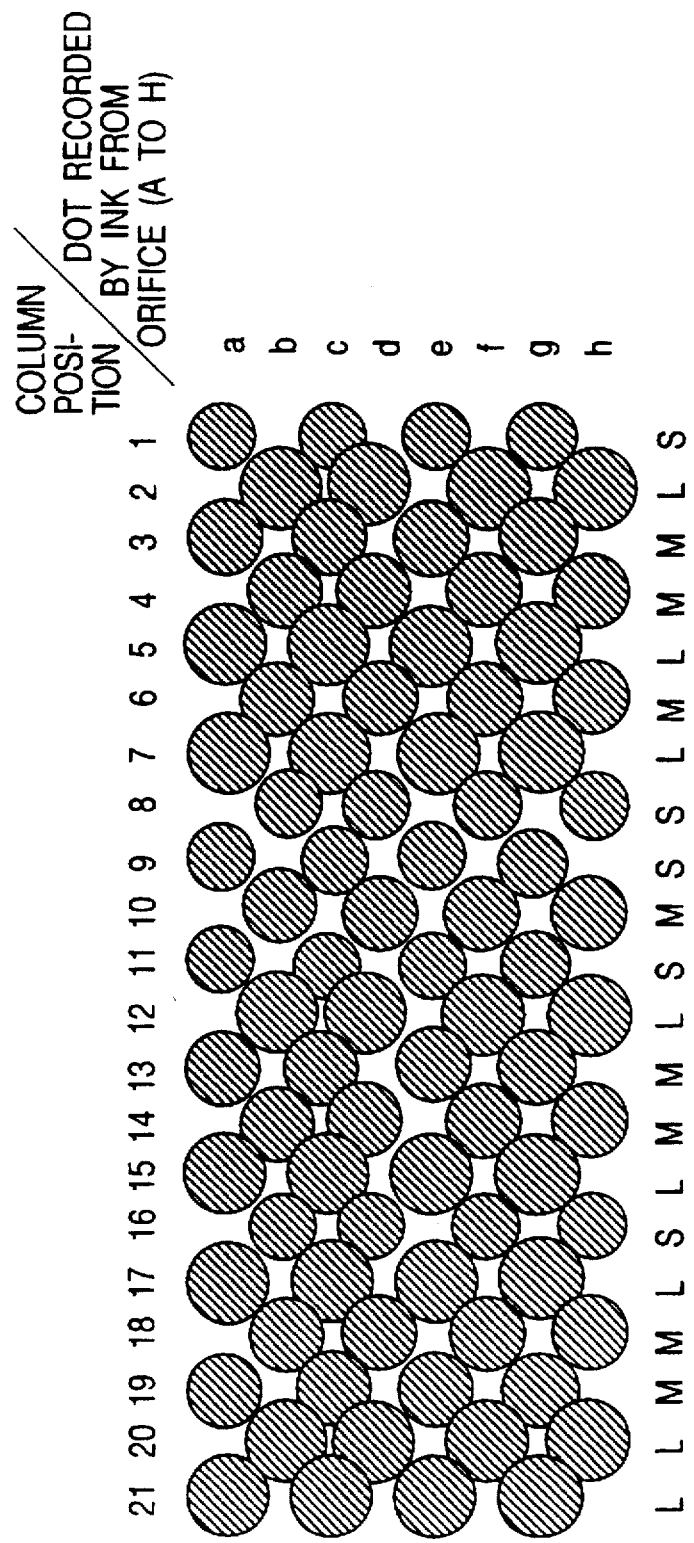
FIG. 21 shows a diagram of a recorded image when a recording method of a further embodiment of the present invention which uses the driving method shown in FIG. 16 is applied to the recording head having the characteristic shown in FIG. 4, FIGS. 22A and 22B show division where the discharge port of the recording head is divided into four blocks.

FIG. 21 shows an image formed by applying the image processing method without the above limitation to the recording head which shows the variation as shown in FIG. 4. The feeling of roughness appears compared to that formed with the limitation.

The above embodiments are described for the central drive in which all discharge ports on the thin ink recording heads are simultaneously driven. The present invention is not limited thereto but it may be applied to the following divided drive.

Figure 1:
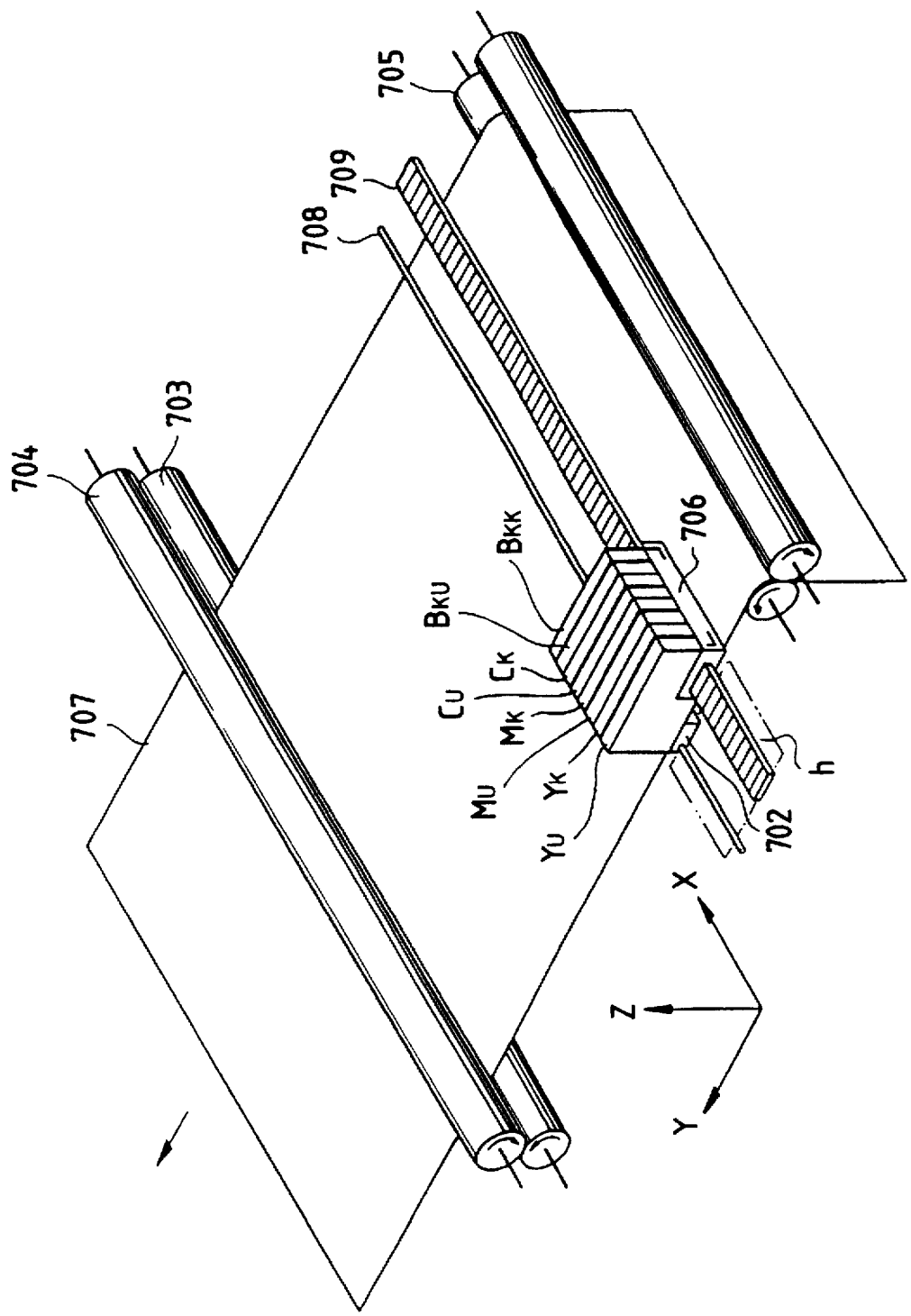
FIG. 1 shows a schematic perspective view of a main part of a prior art color ink jet recording apparatus of a serial print type which uses thick and thin inks.
Figure 2:
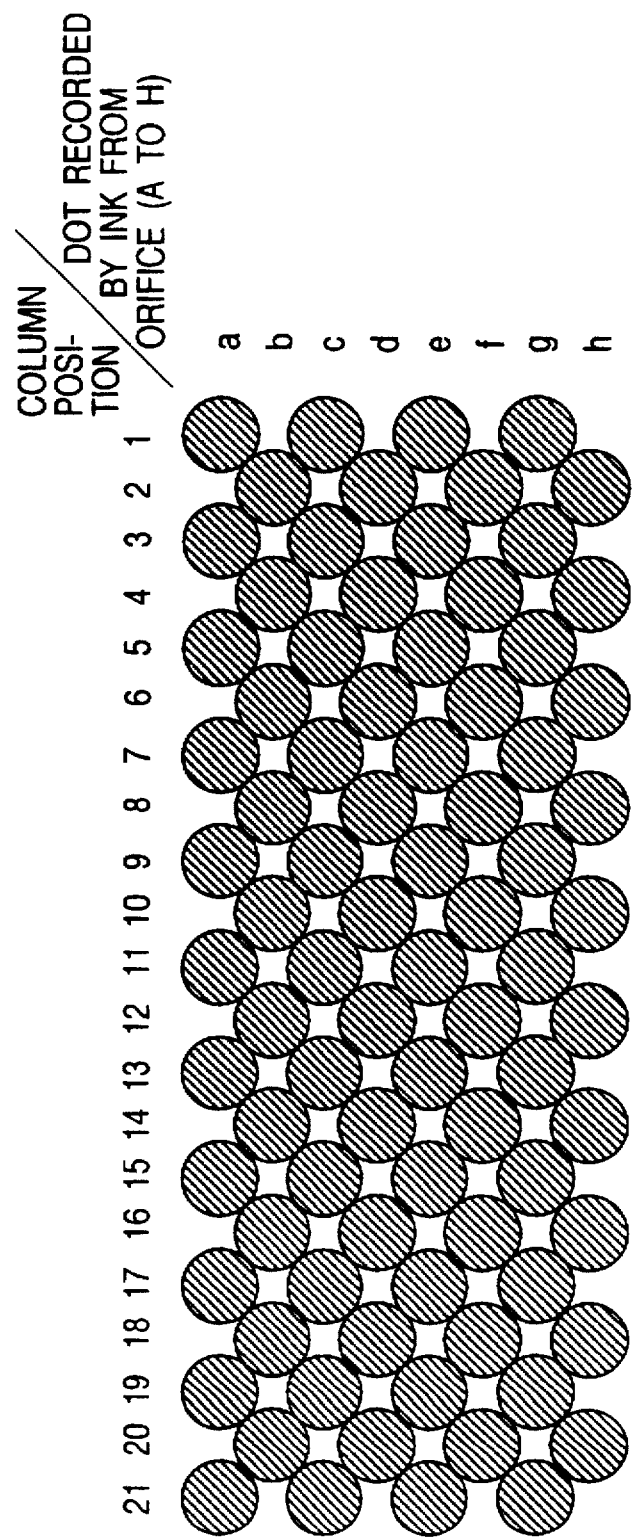
FIG. 2 shows a recorded image of 50% duty factor by an ideal dot pattern.

FIGS. 22A and 22B show views of the recording head viewed from the side of the discharge ports. The discharge ports are divided into four blocks BEi1, BEi2, BEi3 and BEi4 and the respective discharge ports are designated thereby. FIGS. 22C-1 to 22C-4 show a timing chart of drive signals supplied to the discharge ports for each block of the blocks BEi1, BEi2, BEi3 and BEi4.

The discharge ports on the recording heads are divided into four blocks BEi1, BEi2, BEi3 and BEi4 and the off time of the drive pulse of each block is irregularly controlled for the block drive (FIG. 22B) or the divided drive (FIG. 22A) so that the dots of irregular areas may be formed for each block in the sub-scan direction and the variation of the density is less prominent.

By applying irregular drive pulses for each discharge port, the irregular dot areas are attained over the entire image and the variation of density is still less prominent than that by the block drive or the divided drive. FIG. 5 shows the recorded image when the dots of 25%, 50% and 75% are irregularly formed for each discharge port.

The present invention is particularly suitably usable in an ink jet recording head and an recording apparatus in which an electro-thermal transducer, a laser beam or the like is used to cause a change of state of the ink to eject or discharge the ink, because the high density of pixels and high resolution of recording are attained.

The typical construction and the operational principles are preferably the ones disclosed in U.S. Pat. No. 4,723,129 and U.S. Pat. No. 4,740,796. The principle and the structure are applicable to a so-called on-demand type recording system and a continuous type recording system. Particularly, however, it is suitable for the on-demand type because the principle is such that at least one driving signal is applied to an electro-thermal transducer disposed on a liquid (ink) retaining sheet or liquid passage, the driving signal being large enough to provide such a quick temperature rise beyond a departure from nucleation boiling point, by which the thermal energy is provided by the electro-thermal transducer to produce film boiling on the heating portion of the recording head, whereby a bubble can be formed in the liquid (ink) corresponding to each of the driving signals. By the generation, development and contraction of the bubbles, the liquid (ink) is ejected through an discharge port to produce at least one droplet. The driving signal is preferably in the form of pulse because the development and the contraction of the bubbles can be effected instantaneously, and therefore the liquid (ink) is ejected with fast response. The driving signal is preferably such as those disclosed in U.S. Pat. No. 4,463,359 and U.S. Pat. No. 4,345,262. In addition, the temperature rise rate of the heating surface is preferably such as those disclosed in U.S. Pat. No. 4,313,124.

The structure of the recording head may be those shown in U.S. Pat. No. 4,558,333 and U.S. Pat. No. 4,459,600 in which the heating portion is disposed at a bent portion, as well as the structure of the combination of the ejection outlet, liquid passage and the electro-thermal transducer disclosed in the above-mentioned patents. In addition, the present invention is applicable to the structure disclosed in Japanese Laid-Open Patent Application No. 59-123670 in which a common slit is used as the discharge port for a plurality of electro-thermal transducers, and the structure disclosed in Japanese Laid-Open Patent Application No. 59-138461 in which an opening for absorbing a pressure wave of thermal energy is formed corresponding to the discharge port. This is because the present invention is effective to perform the recording with certainty and high efficiency irrespective of the type of the recording head.

The present invention is effectively applicable to a so-called full-line type recording head having a length corresponding to the maximum recording width such a recording head may comprises a single recording head and plural recording head combined to cover the maximum width.

In addition, the present invention is applicable to a serial type recording head in which the recording head is fixed on a main assembly, to a replaceable chip type recording head which is connected electrically with the apparatus and can be supplied with the ink when it is mounted in the main assembly, or to a cartridge type recording head having an integral ink container.

The provision of the recovery means and/or the auxiliary means for the preliminary operation are preferable because they further stabilize the effects of the present invention. As for such means, there are capping means for the recording head, cleaning means therefor, pressing or sucking means, preliminary heating means which may be an electro-thermal transducer, an additional heating element or a combination thereof also, means for effecting preliminary discharge (not for the recording) may stabilize the recording operation.

As regards the variation of the recording head mountable, it may be a single for a single color or plural for a plurality of inks having different colors or densities. The present invention is effectively applicable to an apparatus having at least one of a monochromatic mode mainly with black, a multi-color mode with different color inks and/or full color mode using the mixture of colors, which may be an integrally formed recording unit or a combination of a plurality of recording heads.

Furthermore, in the foregoing embodiment, the ink is liquid. Alternatively, ink which is solidified below a room temperature and liquefied at a room temperature may be used. Since the ink is controlled within a temperature range of not lower than 30° C. and not higher than 70° C. to stabilize the viscosity of the ink to provide the stable discharge in a conventional recording apparatus of this type, the ink may be such that it is liquid within the temperature range when the recording signal is the present invention is applicable to other type of ink. In one of them, the temperature rise due to the thermal energy is positively prevented by consuming it for the state change of the ink from the solid state to the liquid state. Other ink is solidified when it is left, to prevent the evaporation of the ink. In any case, the application of the recording signal producing thermal energy, the ink is liquefied, and the liquefied ink may be discharged. Other ink may start to be solidified at the time when it reaches the recording sheet. The present invention is also applicable to the ink which is liquefied by the application of the thermal energy. Such ink may be retained in liquid state or solid state in holes or recesses formed in a porous sheet as disclosed in Japanese Laid-Open Patent Application No. 54-56847 and Japanese Laid-Open Patent Application No. 60-71260. The sheet is faced to the electro-thermal transducers. The most effective one of the inks described above is the film boiling system.

The ink jet recording apparatus may be used as an output terminal of an information processing apparatus such as a computer or the like, as a copying machine combined with an image reader or the like, or a facsimile machine having information sending and receiving functions.

Figure 23:
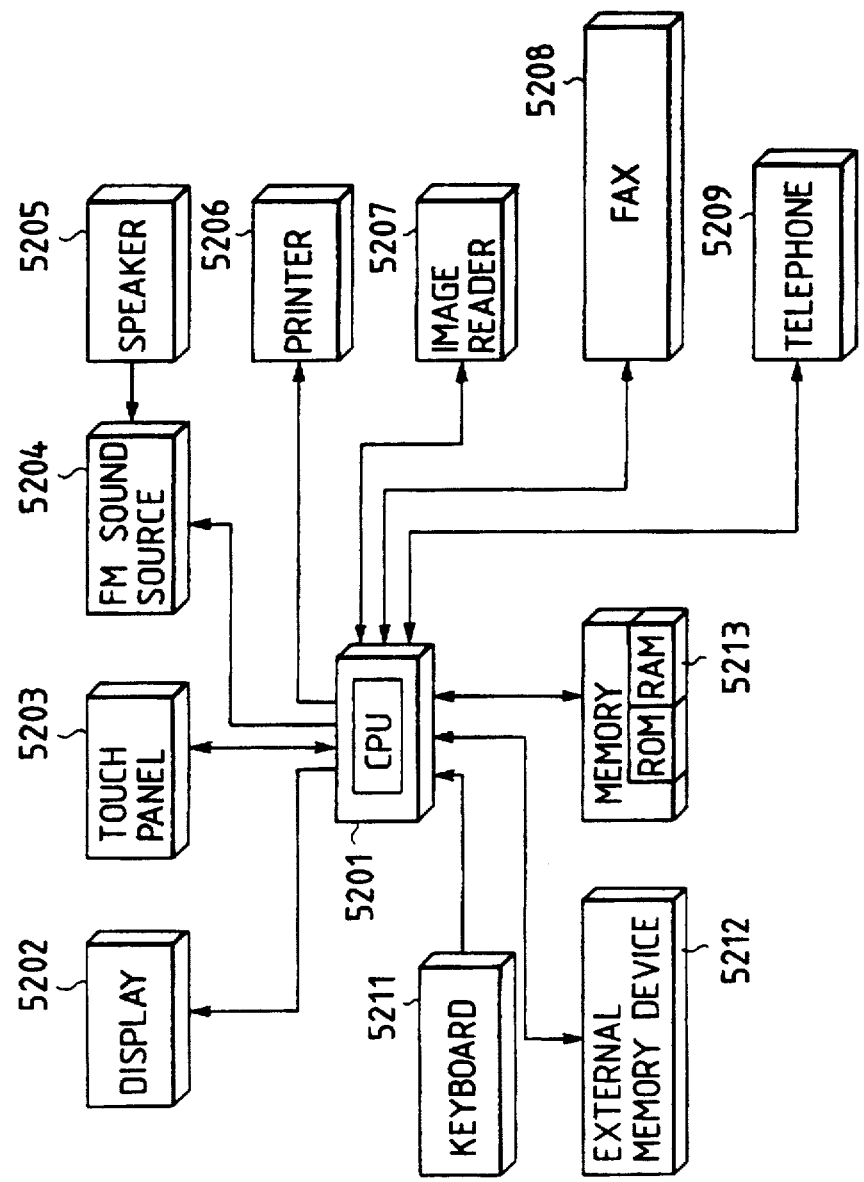
FIG. 23 shows a block diagram of an information processing system comprising an ink jet recording apparatus in accordance with the present invention.

FIG. 23 shows a block diagram of a general configuration when the recording apparatus of the present invention is applied to an information processing apparatus having a function of a word processor, a personal computer, a facsimile apparatus and a copying apparatus. In FIG. 23, numeral 5201 denotes a control unit which controls the overall apparatus and comprises a CPU such as a microprocessor and various I/O ports to output control signals and data signals to various units and receive control signals and data signals from the various units. Numeral 5202 denotes a display device. Various means and document information as well as image data read by an image reader 5207 are displayed on a display screen of the display device. Numeral 5203 denotes a transparent pressure-sensitive touch panel displaced on the display device 5202. By pressing the surface thereof by a finger or the like, an item on the display device 5202 or coordinates can be entered.

Numeral 5204 denotes a frequency modulation (FM) sound source. Music information composed by a music editor is stored in a memory 5210 or an external storage 5212 as digital data and it is read from the memory and frequency-modulated. An electrical signal from the FM sound source 5204 is converted to an audible sound by a speaker unit 5205. A printer unit 5206 serves as an output terminal for the word processor, the personal computer, the facsimile apparatus and the copying apparatus and the recording apparatus of the present invention is applied thereto.

Numeral 5207 denotes an image reader which photo-electrically reads document data. It is arranged in a transport path of the document sheet and reads a document sheet of the facsimile apparatus, a document sheet of the copying apparatus and other various document sheets. Numeral 5208 a facsimile transmission/reception unit which facsimile-transmits the document data read by the image reader 5207 and receives the transmitted facsimile signal and decodes it, and which has an interface function with the external. Numeral 5209 denotes a telephone unit which has various telephone functions such as a conventional telephone function and an automatic response and record function. Numeral 5210 denotes a memory unit which includes a ROM for storing a system program, a manager program and other application programs as well as character fonts and dictionaries, a RAM for storing application programs loaded from the external storage 5212 and character information, and a video RAM.

Numeral 5211 denotes a keyboard for entering document information and various commands. Numeral 5212 denotes the external storage having storage media such as floppy disks and hard disks and contains the character information, music or sound information and user application programs.

Figure 24:
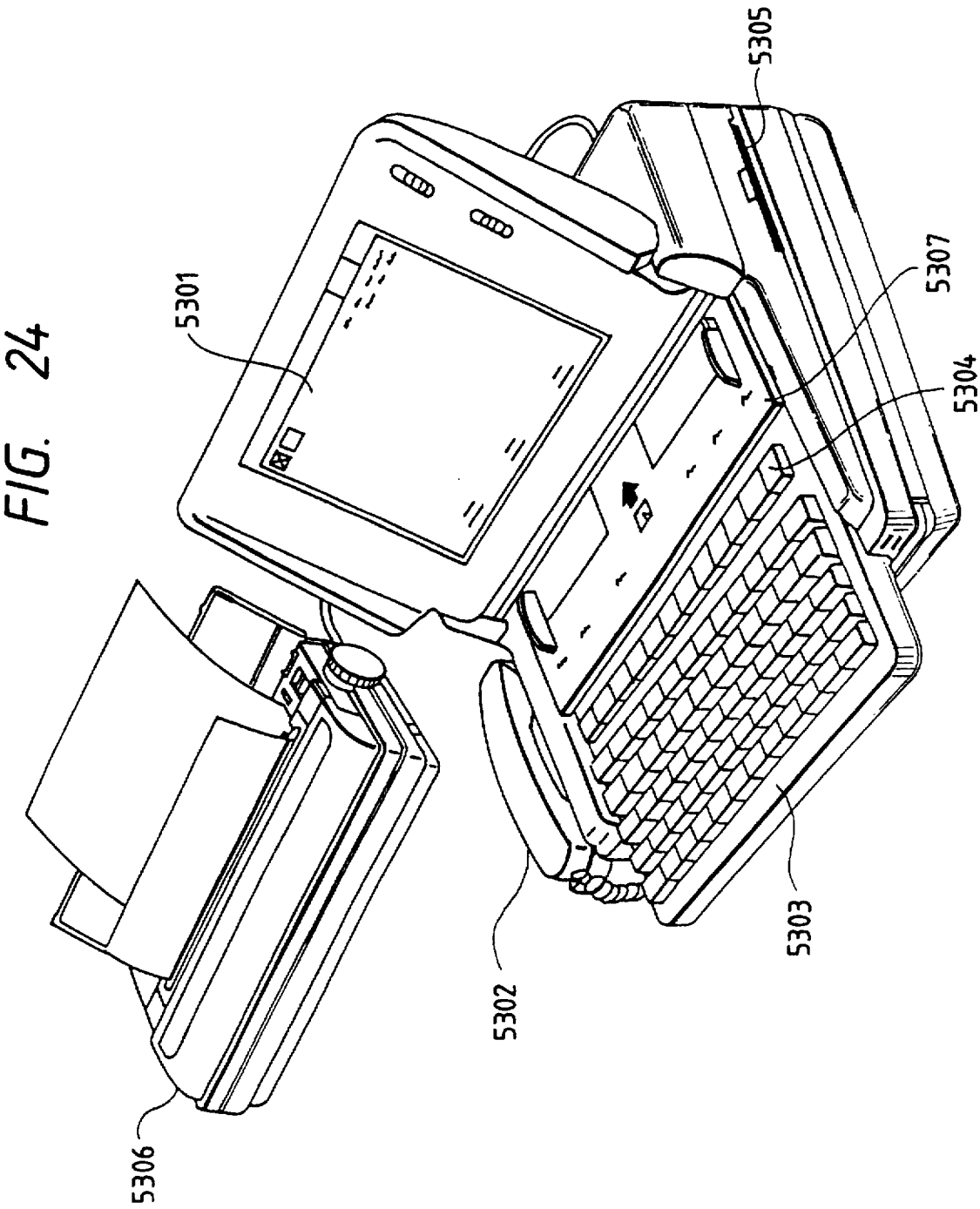
FIG. 24 shows a perspective view of an information processing apparatus in the above system.

FIG. 24 shows an outer view of the information processing apparatus shown in FIG. 23. In FIG. 24, numeral 5301 denotes a flat display panel which uses liquid crystal and displays various menus, graphic information and document information. A touch panel is mounted on the display 5301, and by pressing the surface of the touch panel, coordinates or an item can be entered. Numeral 5302 denotes a hand set which is used when the apparatus function as a telephone set.

The keyboard 5303 is pluggably connected to the apparatus through a cord and permits the entry of various character information and data. Various function keys 5304 are provided in the keyboard 5303. Numeral 5305 denotes an insert slot for the floppy disk.

Numeral 5307 denotes a sheet stacker which stacks the document sheets to be read by the image reader 5207. The read document sheet is ejected from a read side of the apparatus. In the facsimile receive mode, the image is printed by an ink jet printer 5306.

The display device 5301 may be a CRT display but preferably it is a flat panel display such as a liquid crystal display which uses ferroelectric liquid crystal because it offers the advantages of small size, thin thickness and light weight. When the information processing apparatus functions as the word processor, the character information entered from the keyboard 5211 in FIG. 23 is processed by the control unit 5201 in accordance with the document processing program and outputted to the printer unit 5206 as the image. When the information processing apparatus functions as the personal computer, the data entered from the keyboard 5211 is processed by the control unit 5201 in accordance with the application program and the processed result is outputted to the printer unit 5206 as the image. When it functions as the facsimile apparatus, the facsimile information entered from the facsimile transmission/reception unit 5208 through the communication line is processed by the control unit 5201 in accordance with a predetermined program and it is outputted to the printer unit 5206 as the received image.

Figure 25:
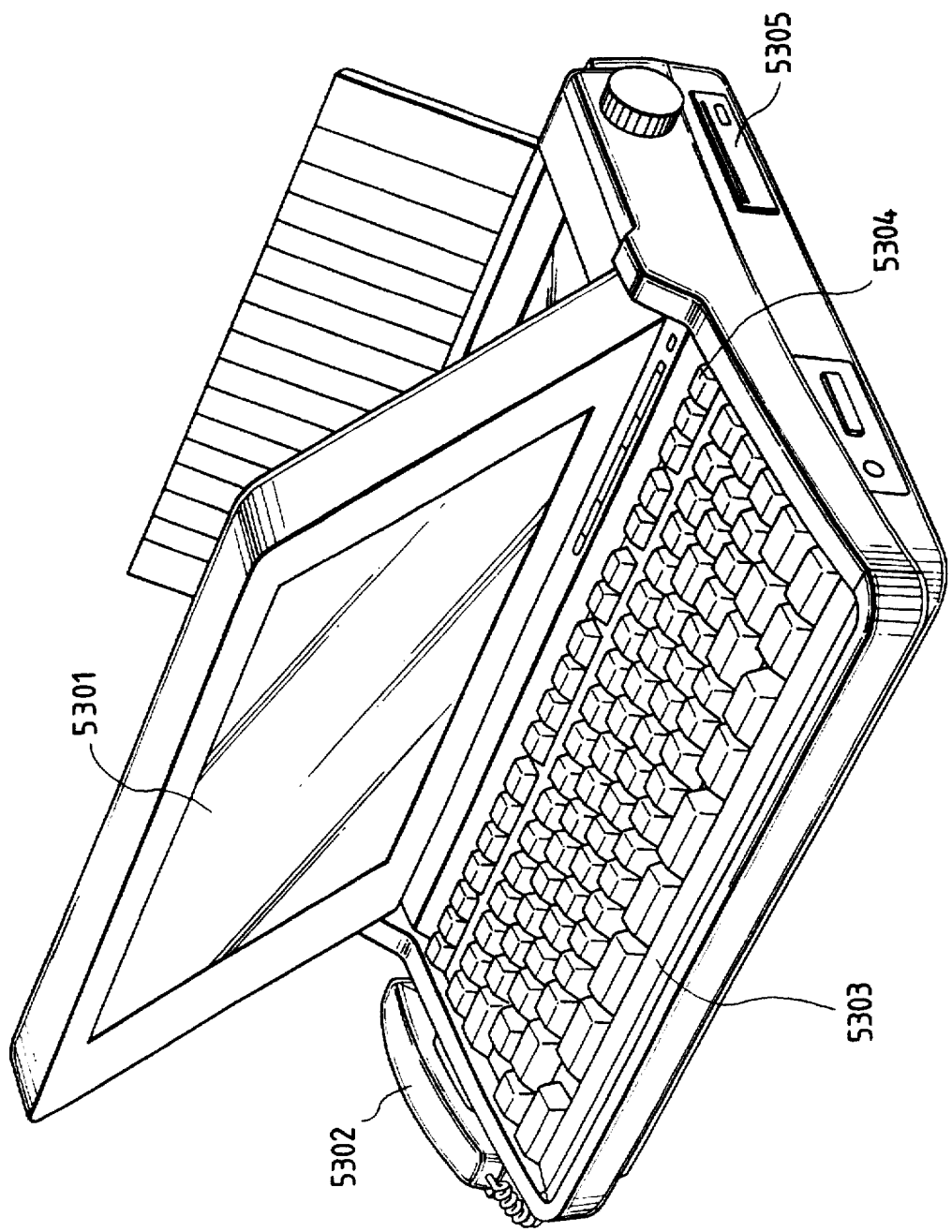
FIG. 25 shows a perspective view of another information processing apparatus.

When it functions as the copying apparatus, the document sheet is read by the image reader 5207 and the read document sheet image is outputted to the printer unit 5206 as the copy image through the control unit 5201. When it functions as the facsimile transmission unit, the document sheet data read by the image reader 5207 is transmission-processed by the control unit 5201 in accordance with a predetermined program and it is transmitted to the communication line through the facsimile transmission reception unit 5208. The information processing apparatus may have the ink jet printer integrally built therein as shown in FIG. 25 so that the portability is enhanced. In FIG. 25, the elements of the same functions as those of FIG. 24 are designated by the same numerals.

By applying the recording apparatus of the present invention to the multi-function information processing apparatus described above, the high grade recorded image is attained and the function of the information processing apparatus is further improved.

In accordance with the present invention, when the thin ink is discharged, the areas of the dots recorded by the respective discharge ports irregularly vary for each discharge port so that the variation of the amount of ink discharged among the discharge ports is spread.

As a result, the stripe such as white stripe or black stripe in the low density area or the highlight area of the image is less prominent and a high quality image is produced.

While the invention has been described with reference to the structures disclosed herein, it is not confined to the details set forth and the present invention is intended to cover such modifications or changes as may come within the objects of the improvements or the scope of the claims.

What is claimed is:

1. An ink jet recording apparatus for recording an image formed from a plurality of pixels by discharging ink onto a recording medium from a recording head for discharging inks of a same color system but different densities, including an ink of a lowest density, from a plurality of discharge ports disposed in an arrangement direction, comprising:

scan means for scanning said recording head in a scan direction relative to said recording medium in a record mode; and control means for randomly controlling sizes of dots recorded on said recording medium by the ink discharged by said recording head as said recording head is scanned by said scan means when the image is recorded using at least the ink of the lowest density of the inks having different densities, said control means randomly changing, in the relative scan direction, a size area of a respective dot formed on said recording medium by the ink of the lowest density discharged from said recording head in units of one drop for each pixel, wherein the image is recorded by performing a single ink discharge for each pixel.

2. An ink jet recording apparatus according to claim 1 wherein said control means controls the sizes of dots recorded on said recording medium such that the sizes are equal along the direction of arrangement of the discharge ports.

3. An ink jet recording apparatus according to claim 1 wherein said recording head creates bubbles in the ink by using thermal energy to eject the ink.

4. An ink jet recording method for recording an image formed from a plurality of pixels by discharging ink onto a recording medium, comprising the steps of:

providing a recording head for discharging inks of a same color system but different densities, including an ink of a lowest density, from a plurality of discharge ports disposed in an arrangement direction;

scanning said recording head in a scan direction relative to said recording medium in a record mode; and randomly controlling sizes of dots recorded on said recording medium by the inks discharged from said recording head as said recording head is scanned when the image is recorded using at least the ink of the lowest density of the inks of different densities, said controlling randomly changing, in the relative scan direction, a size of a respective dot formed on said recording medium by the ink of the lowest density discharged from said recording head in units of one drop for each pixel, wherein the image is recorded by performing a single ink discharge for each said pixel.

5. An ink jet recording method according to claim 4 wherein said controlling step controls the sizes of dots recorded on said recording medium such that the sizes are equal along the direction of arrangement of the discharge ports.

6. An ink jet recording apparatus for recording an image formed from a plurality of pixels by using a recording head having a plurality of discharge ports for discharging a thick ink and a thin ink, respectively, comprising:

scan means for scanning said recording head relative to a recording medium in a relative scan direction; and control means for randomly controlling a size of the thin ink discharged from said recording head when the image is recorded using the thin ink, said control means randomly changing, in the relative scan direction, a size of a respective droplet of the thin ink discharged from said recording head in units of one drop for each pixel, wherein the image is recorded by performing a single ink discharge for each said pixel.

7. An ink jet recording apparatus according to claim 6 wherein said discharge ports are arranged in a line.

8. An ink jet recording apparatus according to claim 7 wherein said recording head includes a plurality of heads each having a plurality of discharge ports arranged in a line.

9. An ink jet recording apparatus according to claim 8 wherein said plurality of heads correspond to a plurality of different colors.

10. An ink jet recording apparatus according to claim 6 wherein said recording head discharges the ink by using thermal energy.

11. An ink jet recording apparatus according to claim 6 further comprising a carriage for supporting said recording head.

12. An ink jet recording apparatus according to claim 6 further comprising transport means for transporting the recording medium recorded upon by said recording head.

13. An ink jet recording apparatus according to claim 6 wherein said recording apparatus is applied to a copying apparatus.

14. An ink jet recording apparatus according to claim 6 wherein said recording apparatus is applied to a facsimile apparatus.

15. An ink jet recording apparatus according to claim 6 wherein said recording apparatus is applied to a computer terminal.

16. A method for reducing variation in density on a low density area of an image formed from a plurality of pixels on a recording medium, comprising the steps of:

providing a recording head for discharging inks of the same color system but different densities from a plurality of discharge ports;

relatively scanning said recording head in a scan direction to said recording medium in a record mode; and randomly controlling sizes of dots recorded on said recording medium by the inks discharged from said recording head as said recording head is scanned when the image is recorded using at least the ink of the lowest density of the inks of different densities, said controlling randomly changing, in the relative scan direction, a size of a respective dot formed on said recording medium by the ink of the lowest density discharged from recording head in units of one drop for each said pixel, wherein the image is recorded by performing a single ink discharge for each said pixel.

* * * * *

UNITED STATES PATENT AND TRADEMARK OFFICE
CERTIFICATE OF CORRECTION

PATENT NO.　:　5,729,259

DATED　　　:　March 17, 1998

INVENTOR(S):　FUMIHIRO GOTOH ET AL.　　　　Page 1 of 3

It is certified that error appears in the above-identified patent and that said Letters Patent is hereby corrected as shown below:

IN THE DRAWINGS

Sheet 14, FIG. 15, "MINTMUM" should read --MINIMUM--.

COLUMN 1

Line 57, "increase," should read --increases,--.

COLUMN 2

Line 3, "rate" should read --rare--;
    Line 4, "moare" should read --moiré--;
    Line 30, "an-arrow" should read --an arrow--;
    Line 48, "dot" should read --dots--;
    Line 62, "formnd" should read --formed--; and
    Line 63, "whitey" should read --whitish--.

COLUMN 3

Line 1, "port" should read --ports--;
    Line 10, "whitey." should read --whitish.--;
    Line 18, "As an" should read --As a--; and
    Line 46, "of big" should read --of the big--.

COLUMN 5

Line 38, "other" should read --another--.

COLUMN 7

Line 20, "head" should read --heads--; and
    Line 30, "310" should read --3100-- and
        "frame" should read --frame, and--.

UNITED STATES PATENT AND TRADEMARK OFFICE
CERTIFICATE OF CORRECTION

PATENT NO. : 5,729,259

DATED : March 17, 1998

INVENTOR(S) : FUMIHIRO GOTOH ET AL.

Page 2 of 3

It is certified that error appears in the above-identified patent and that said Letters Patent is hereby corrected as shown below:

COLUMN 8

Line 60, "to a" should read --to--.

COLUMN 11

Line 33, "128 is" should read --128 are--; and
Line 66, "by as" should read --by a--.

COLUMN 12

Line 21, "represent" should read --represents--;
Line 30, "form" should read --from--; and
Line 67, "and an" should read --and a--.

COLUMN 13

Line 20, "an" should read --a--.
Line 48, "such a" should read --such that a--;
Line 49, "comprises" should read --comprise--; and
Line 66, "thereof also," should read --thereof; also,--.

COLUMN 14

Line 17, "is the" should read --in the--; and
Line 22, "case, the" should read --case, in the--.

COLUMN 15

Line 5, "5208" should read --5208 denotes--;
Line 30, "or an" should read --of an--; and
Line 31, "function" should read --functions--.

UNITED STATES PATENT AND TRADEMARK OFFICE
CERTIFICATE OF CORRECTION

PATENT NO. : 5,729,259

DATED : March 17, 1998

INVENTOR(S) : FUMIHIRO GOTOH ET AL.

It is certified that error appears in the above-identified patent and that said Letters Patent is hereby corrected as shown below:

COLUMN 18

Line 34, "recording" should read --said recording-- and "each said" should read --each--.

Signed and Sealed this

Eighth Day of December, 1998

Attest:

Attesting Officer

BRUCE LEHMAN

Commissioner of Patents and Trademarks